United States Patent
Sundaram et al.

(10) Patent No.: US 12,320,025 B2
(45) Date of Patent: Jun. 3, 2025

(54) ELECTROCHEMICAL DEPOSITION OF FUNCTIONALIZED HIGH ENTROPY ALLOYS

(71) Applicant: University Of Cincinnati, Cincinnati, OH (US)

(72) Inventors: Murali Sundaram, Montgomery, OH (US); Anne Brant, Cincinnati, OH (US); Sravya Josyula, Hyderabad (IN)

(73) Assignee: University of Cincinnati, Cincinnati, OH (US)

( * ) Notice: Subject to any disclaimer, the term of this patent is extended or adjusted under 35 U.S.C. 154(b) by 0 days.

(21) Appl. No.: 17/473,208

(22) Filed: Sep. 13, 2021

(65) Prior Publication Data

US 2022/0081794 A1  Mar. 17, 2022

(51) Int. Cl.
  *C25D 1/04* (2006.01)
  *C25D 11/34* (2006.01)
  *C25D 17/12* (2006.01)
  *C25D 21/12* (2006.01)

(52) U.S. Cl.
  CPC .......... *C25D 1/04* (2013.01); *C25D 11/34* (2013.01); *C25D 17/12* (2013.01); *C25D 21/12* (2013.01)

(58) Field of Classification Search
  None
  See application file for complete search history.

(56) References Cited

U.S. PATENT DOCUMENTS

| 2004/0011432 A1* | 1/2004 | Podlaha | C25D 5/611 205/255 |
| 2010/0006445 A1* | 1/2010 | Tomantschger | C25D 17/00 204/229.4 |
| 2019/0360116 A1* | 11/2019 | Collinson | C25D 21/12 |

OTHER PUBLICATIONS

Soare et al. "Electrochemical deposition and microstructural characterization of AlCrFeMnNi and AlCrCuFeMnNi high entropy alloy thin films", Applied Surface Science, 358, 2015, 533-539 (Year: 2015).*
Yoosefan et al. "Synthesis of CoCrFeMnNi high entropy alloy thin films by pulse electrodeposition: Part 1: Effect of Pulse Electrodeposition Parameters", Metals and Materials International, 2020, 26: 1262-1269 (Year: 2020).*
English translation, CN 108728876, Wang et al. Nov. 2, 2018 (Year: 2018).*
Aliyu et al. "Microstructure-electrochemical property correlation in electrodeposited CuFeNiCoCr high-entropy alloy-graphene oxide composite coatings", Philosophical Magazine, 2019, vol. 99, No. 6, 718-735 (Year: 2019).*
Mehrizi et al. "Study of microstructure and magnetic properties of electrodeposited nanocrystalline CoFeNiCu thin films", Surface & Coatings Technology, 205, 2011, 4757-4763 (Year: 2011).*
English translation JP 3394209 Apr. 7, 2003 (Year: 2003).*

(Continued)

*Primary Examiner* — Stefanie S Wittenberg
(74) *Attorney, Agent, or Firm* — Wood Herron & Evans LLP

(57) ABSTRACT

A method of depositing a high entropy alloy onto an electrode surface is provided. The method includes providing a bath including a plurality of ions of a plurality of metals. The method further includes submerging, at least partially, an electrode including an electrode surface in the bath. The method further includes applying a voltage to the electrode to form a high entropy alloy on the electrode surface.

20 Claims, 31 Drawing Sheets
(31 of 31 Drawing Sheet(s) Filed in Color)

(56) References Cited

OTHER PUBLICATIONS

Munoz et al. "Magneto impedance of electroplated NiFeMo/Cu microwires for magnetic sensors", Journal of Physics D:Applied Physics, 40, 2007, 5013-5020 (Year: 2007).*
English translation CN 108728876, 2018 (Year: 2018).*
Brant A., et al., Electrochemical additive manufacturing of graded NiCoFeCu structures for electromagnetic applications, Manufacturing Letters, 2021 Society of Manufacturing Engineers, 4 pages.

* cited by examiner

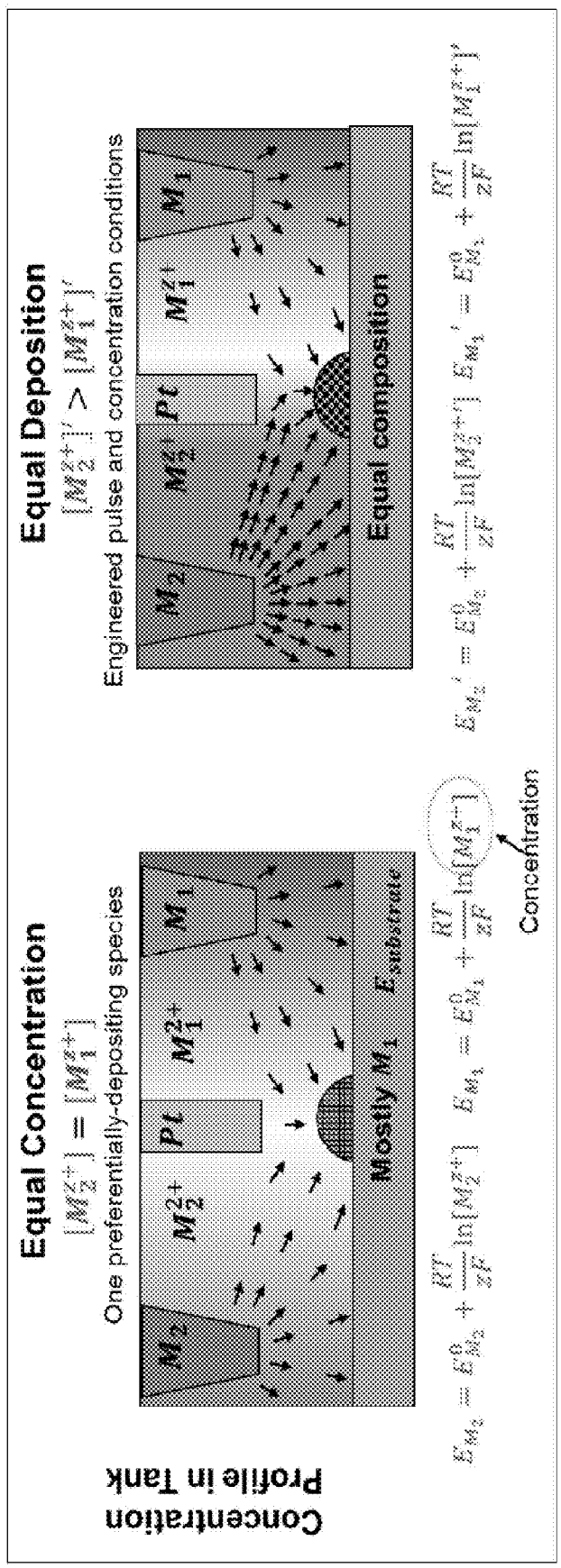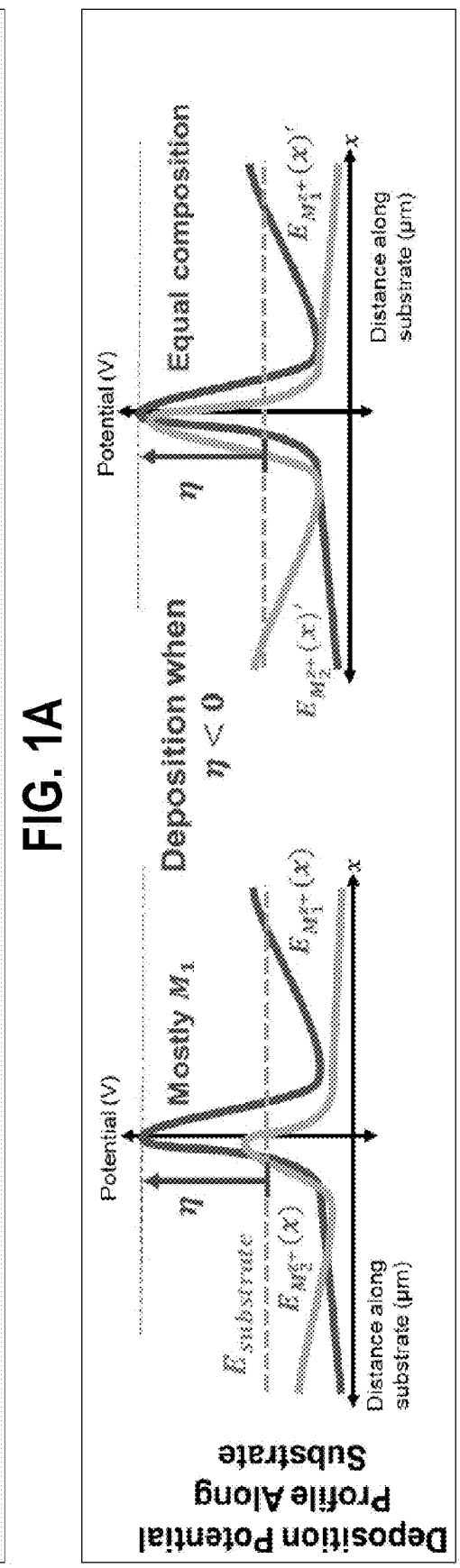
FIG. 1A
FIG. 1B

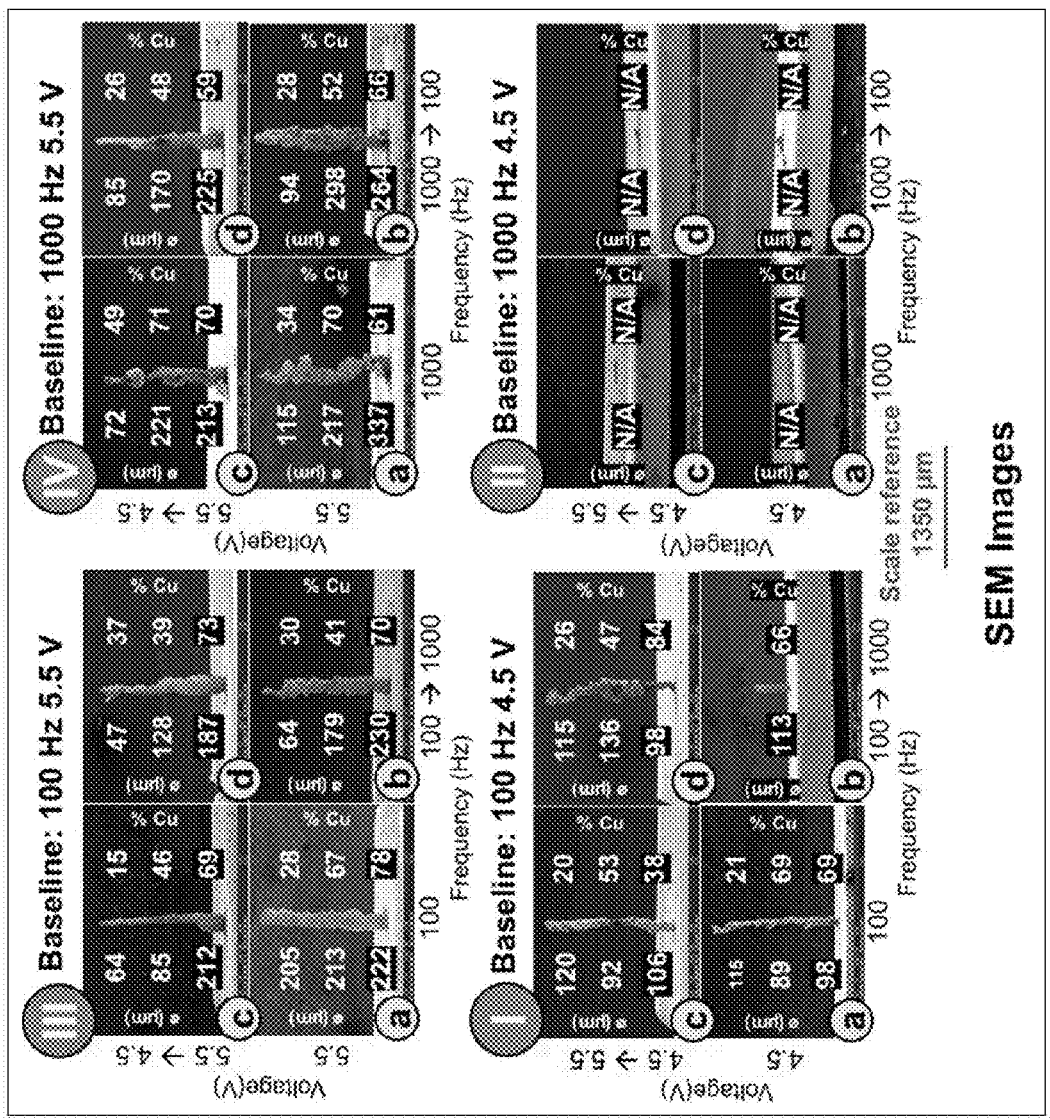
FIG. 20B SEM Images
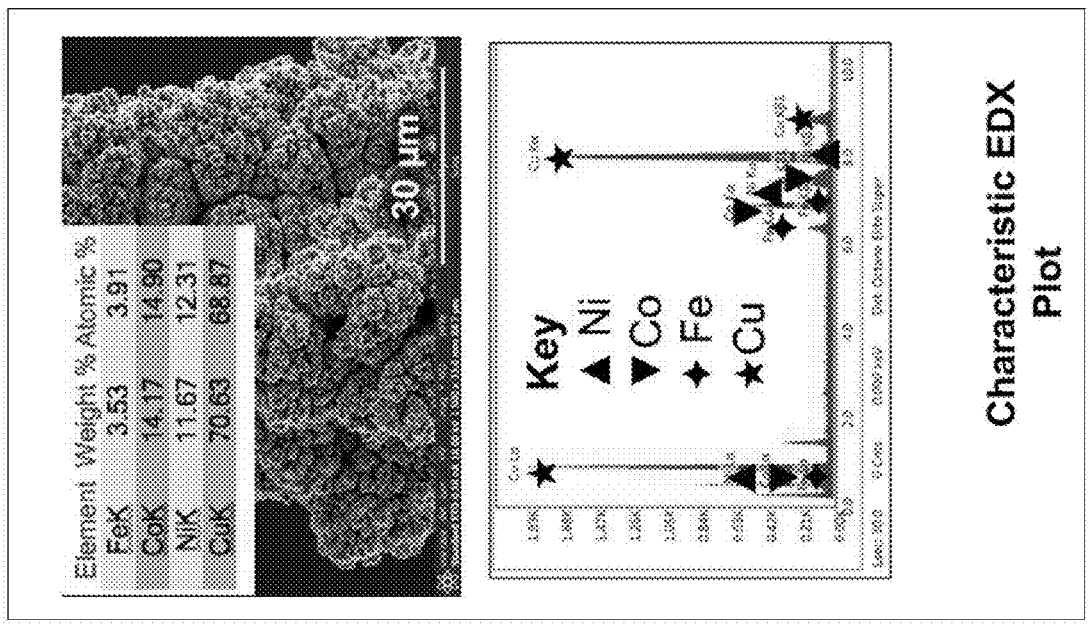
FIG. 20A Characteristic EDX Plot

FIG. 23A Electrochemical cell

FIG. 23B ECAM setup

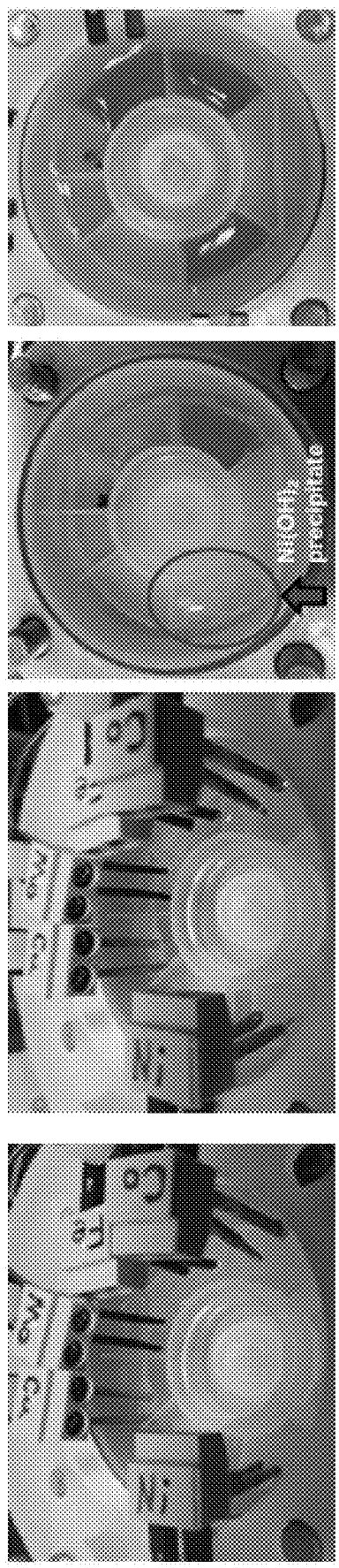
FIG. 25A Initial stages of dissolution into blank electrolyte
FIG. 25B Five minutes into simultaneous dissolution
FIG. 25C Initial simultaneous dissolution attempt
FIG. 25D Final simultaneous dissolution attempt

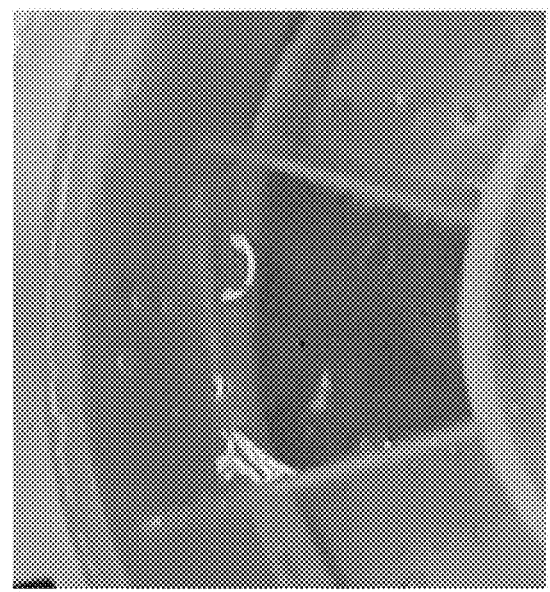
FIG. 27A Electrode surfaces
FIG. 27B Before agitation
FIG. 27C After agitation

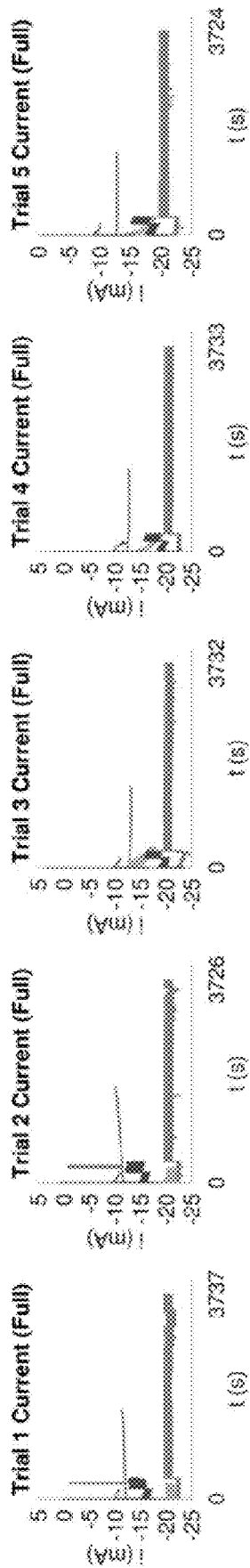
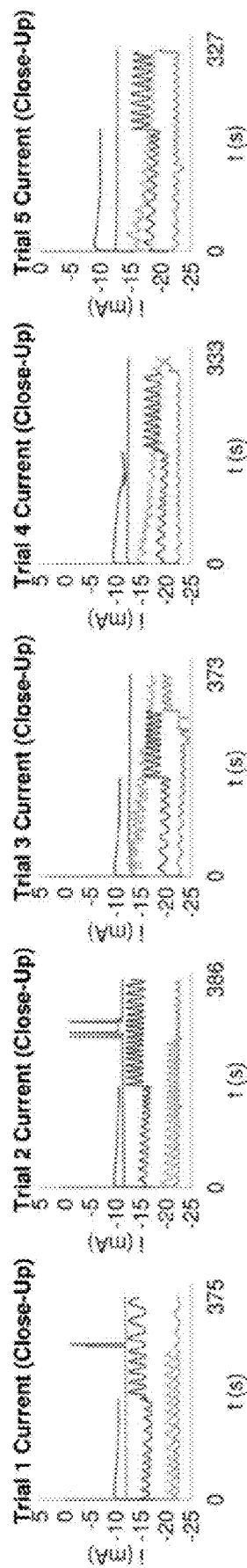
FIG. 28A FIG. 28B FIG. 28C FIG. 2D8 FIG. 28E
FIG. 28F FIG. 28G FIG. 28H FIG. 28I FIG. 28J

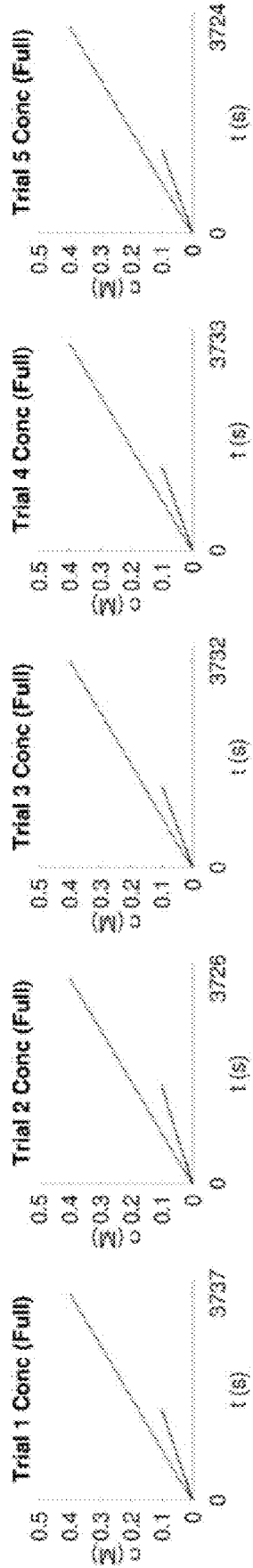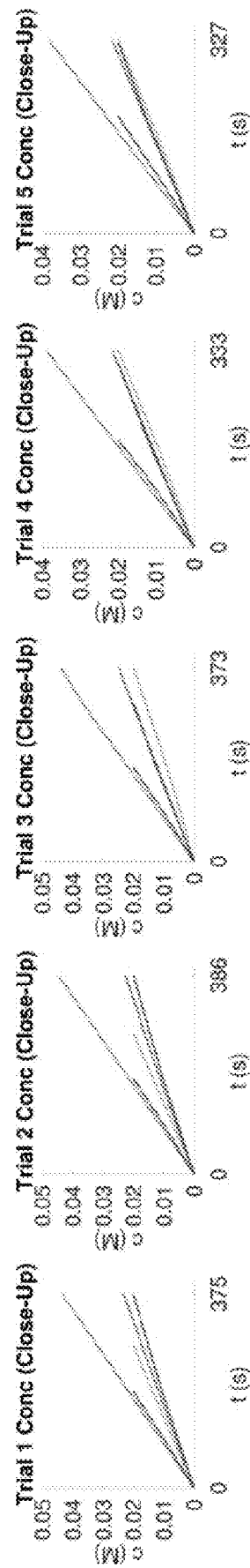
FIG. 28K  FIG. 28L  FIG. 28M  FIG. 28N  FIG. 28O
FIG. 28P  FIG. 28Q  FIG. 28R  FIG. 28S  FIG. 28T

Elemental component baths

(i) Co → (ii) Fe → (iii) Cu → (iv) Mo → (v) 10 hrs → (vi) Ni

Mixing sequence of initial bath

(i) Co→Fe→Cu→Mo→(10 hrs)→Ni
(ii) Ni→Co→Fe→Cu→Mo
(iii) Co→Fe→Cu→Mo→Ni

Final baths

FIG. 30

ELECTROCHEMICAL DEPOSITION OF FUNCTIONALIZED HIGH ENTROPY ALLOYS

STATEMENT REGARDING FEDERALLY SPONSORED RESEARCH OR DEVELOPMENT

This invention was made with government support under CMMI-1955842 awarded by the National Science Foundation (NSF). The government has certain rights in the invention.

CROSS-REFERENCE TO RELATED APPLICATIONS

This application claims priority to, and the benefit of the filing date of, U.S. Provisional Application No. 63/077,166 filed Sep. 11, 2020, the disclosure of which is incorporated by reference herein in its entirety.

TECHNICAL FIELD

The present invention relates to electrodeposited alloys. Particularly, the present invention relates to electrodeposited alloys by nonthermal methods. Related fields also include: additive manufacturing, electrochemistry.

BACKGROUND

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Interest in metal alloys of varying compositions, and assemblies of such components, is on the rise across many applications where a balance of functionality (i.e.: electromagnetic), constraints (i.e. weight), and resistance to elements (i.e.: thermal, corrosion, wear) is desired. However, methods of composite assembly introduce design constraints and manufacturing complexity. An alternative to fabricate such parts is functionally-graded additive manufacturing (FGAM), in which multi-material additive manufacturing is per-formed using spatially-varying compositions of metals via discrete, computerized control. However conventional FGAM of metals relies on metallurgical (thermomechanical) means of alloy formation, presenting serious issues in process control and integrity of the final part. Due to these complications, metal FGAM processes remain in a technologically early state. Electrochemical additive manufacturing (ECAM) is emerging as an alternate, nonthermal means of additive manufacturing (AM). Electrochemical deposition of metals involves an entirely different crystallization mechanism than that of thermal processes. Electrochemical deposition allows for more-dispersed alloys (i.e. solid solutions for a silver-lead system) to be deposited; in contrast to metallurgy, which is limited to production of eutectic mixtures.

Electrochemical additive manufacturing (ECAM) is an emerging, nontraditional additive manufacturing process capable of fabricating three-dimensional metal parts in a nonthermal, voxel-by-voxel manner using localized electrochemical deposition (LED). Single-metal Ni or Cu systems have been the predominant focus of ECAM and LED studies, followed by the deposition of binary alloys such as NiCu or NiCr. Most recently, a study including the present inventor demonstrated the deposition of a quaternary NiCoFeCu alloy in a compositionally-graded manner. A further expansion in the material system repertoire and compositional control in ECAM advances the technological relevance and commercial viability of the process.

Although a variety of systems and parameters have been studied for ECAM, the concept of compositionally-graded ECAM-built parts has not yet been performed outside of the inventive embodiments included herein. Accordingly, there is a need for ECAM processes and systems.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

Many of the drawbacks and limitations of functionally-graded additive manufacturing by conventional metallurgical means stated above can be resolved by the ECAM system described herein. Getting the ECAM system to function may include many subtasks, including but not limited to: creating novel and advanced interplays of chemicals, materials, sensors, electronics, microfluidics, algorithms, computing, software, systems, and other features or designs, in a manner that affordably, effectively, conveniently, intelligently, and/or reliably brings sensing technology into proximity with sample fluids containing at least one analyte of interest to be measured to control the system.

Embodiments of the disclosed invention are directed to electrochemical deposition of high entropy alloys onto an electrode surface where the HEA includes at least 5 metal species. This study contributes to such progress by demonstrating the feasibility of electrolyte compositional control via dissolution and deposition of a five-metal system. This opens the door to more versatile compositional control compared to that of a premixed bath; as well as ECAM deposition of high-entropy alloys (HEAs), which contain 5 or more metals in near-equal ratios and which have been the subject of recent engineering interest for varying applications due to their unique properties.

In addition, embodiments of the disclosed invention are directed to electrochemical deposition of alloys having two or more metal species. The source of the metal ions in solution prior to deposition onto an electrode surface may be from metal salts pre-mixed into an aqueous bath or source anodes made of metals to be dissolved into solution.

And so, one aspect of the present invention is directed to a method of depositing a high entropy alloy onto an electrode surface is provided. The method includes providing a bath including a plurality of ions of a plurality of metals. The method further includes submerging, at least partially, an electrode including an electrode surface in the bath. The method further includes applying a voltage to the electrode to form a high entropy alloy on the electrode surface.

BRIEF DESCRIPTION OF THE DRAWINGS

The patent or application file contains at least one drawing executed in color. Copies of this patent or patent application publication with color drawing(s) will be provided by the Office upon request and payment of the necessary fee The objects and advantages of the disclosed invention will be further appreciated in light of the following detailed descriptions and drawings in which:

FIGS. 1A and 1B are schematics of the alloy deposition strategy to flexibly engineer the conditions in order to achieve desired ion behavior of M1 dominated deposition (FIG. 1A), to engineer an alloy deposition of desired composition (FIG. 1B);

FIGS. 20A and 20B show pillar characterization of representative clos-up SEM image and EDX scan at the midpoint of a pillar build under baseline conditions 4.5 V and 100 Hz and SEM images of compositionally-graded pillars; N/A refers to broken or incomplete deposits;

FIGS. 25A, 25B, 25C, and 25D are a series of photographs of observations of parallel dissolution of constituent metals Ni, Co, Fe, Cu, and Mo;

FIGS. 27A, 27B, and 27C are a series of photographs of observations after Mo dissolution;

FIGS. 28A, 28B, 28C, 28D, 28E, 28F, 28G, 28G, 28H, 28I, 28J, 28K, 28L, 28M, 28N, 28o, 28P, 28Q, 28R, 28S, and 28T are a collection of graphs plotting the dissolution current and accumulated concentration over time;

FIG. 30 is a schematic and photographs of resultant SEM images and EDX-derived metal percentages in pillars constructed under varying build conditions.

DETAILED DESCRIPTION

Figure 2:
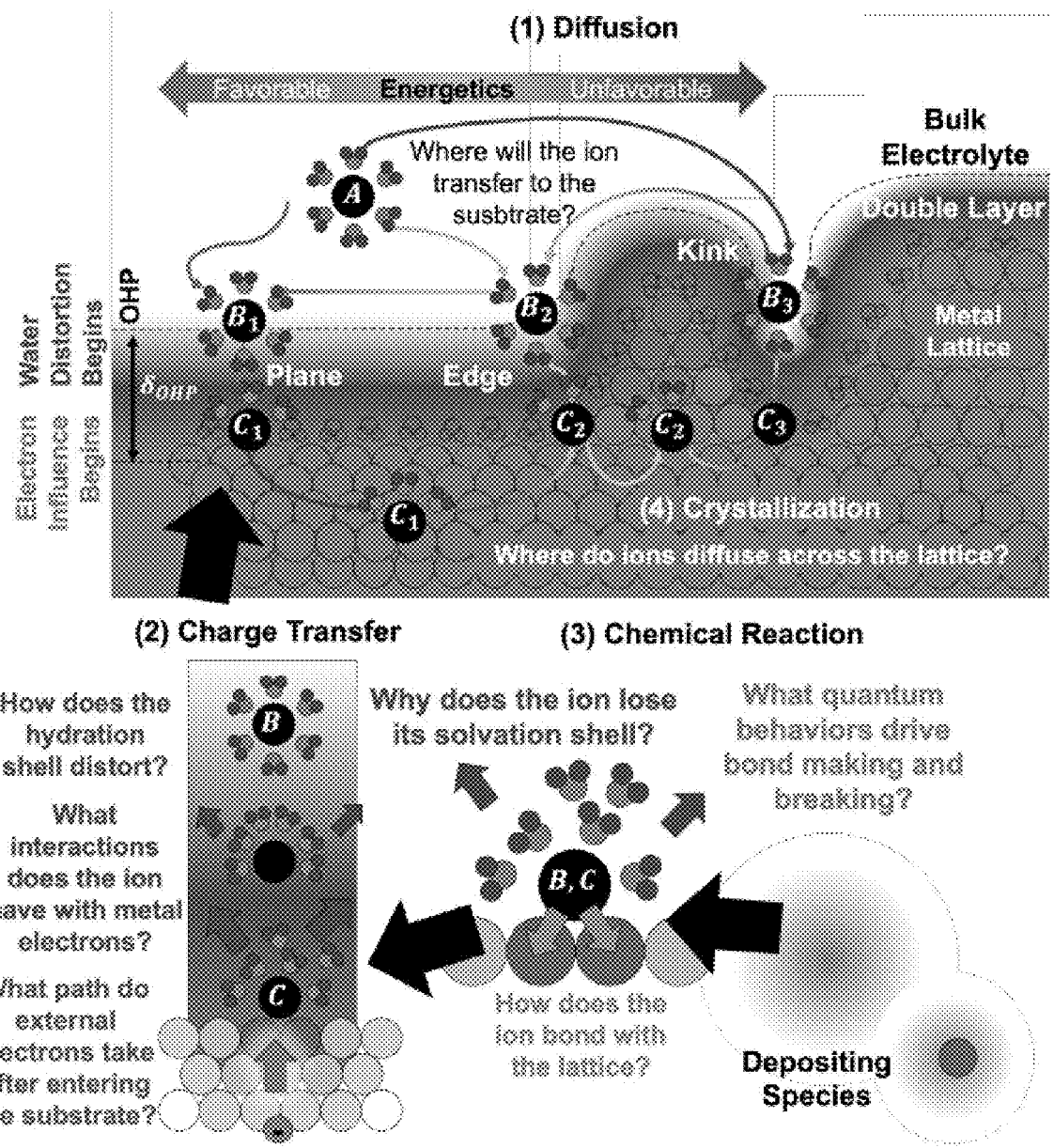
FIG. 2 is an illustration of partial reactions involved in the elecrodeposition process and knowledge gap.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, embodiments of the disclosed invention are directed to electrochemical deposition of high entropy alloys onto an electrode surface where the HEA includes at least 5 metal species.

And so, one aspect of the present invention is directed to a method of depositing a high entropy alloy onto an electrode surface is provided. The method includes providing a bath including a plurality of ions of a plurality of metals. The method further includes submerging, at least partially, an electrode including an electrode surface in the bath. The method further includes applying a voltage to the electrode to form a high entropy alloy on the electrode surface.

In another embodiment, supporting electrolyte species (acid/base, buffer, additive, accelerator) were present in the bath in order to make sure the ions are soluble and deposit successfully.

In another embodiment, the metal ions are present in appropriate ratios for desired deposition behavior.

In another embodiment, the applying of the voltage to the electrode is at a magnitude, duty cycle, and frequency to form the HEA on the electrode surface.

In another embodiment, the method includes performing localized deposition of custom 3D geometries with voxel-by-voxel assignment of material composition To that end, aspects of the present invention posit that the alloy composition in multi-material electrodeposition is predetermined by a highly complex function of all ions, their codeposition relationships, their properties, and the electrochemical environment. When working with multiple ions, some ion pairs exhibit an anomalous codeposition relationship under certain conditions, where the ion preference is naturally opposite to that of the electrochemical series of standard electrode potentials. This is due to very specific competing behaviors at the atomic scale. The preference of deposition of a given ion ultimately boils down to an energy balance of whether it is energetically-favorable to stay in the aqueous state or to receive electrons (in one or multiple steps) and transition to the solid state. This is associated with costs/barriers (hydration energy) and gains/stabilizations (ionization energy, sublimation energy). If the gains are greater than the costs, then the ion undergoes the reaction. The specific values are specific to each ion and also highly sensitive to the environment and if ions of other species are present. Therefore, simply saying that ion deposition is determined by standard electrode potential, or even Nernst potential, is not accurate. The natural preference is a highly complex function of all ions, their codeposition relationships, their properties, and the electrochemical environment. Extensive experimental and simulation study is required to understand and better control the system for the desired deposition.

To test this hypothesis, the free metal ion concentration of the elements in the electrolyte at the deposition location were changed during an electrodeposition as illustrated in FIGS. 1A and 1B to locally alter their redox potentials. The knowledge resulting from this approach lead to design and deposition of novel high entropy alloys (HEA) such as CoCrCuFeMoNi by the electrochemical additive manufacturing (ECAM) process through a selective dissolution of ions from sacrificial working electrodes made of the constituent elements, and selective localized deposition of the ions on the substrate. ECAM is a process that combines the principles of 3D additive manufacturing with localized electrochemical deposition to achieve 3D metal additive manufacturing. The feasibility of dissolving and re-depositing multi-materials in liquid solvents using electrochemistry has recently been demonstrated.

The material composition is controlled in a voxel-by-voxel manner. Feasibility of doing so from a premixed electrolyte was demonstrated. However, there is only so much versatility in controlling the output composition. Therefore, the control over the metal ion concentration in the tank enhances versatility of the control over the final deposit composition. Control over metal ion concentration in the tank can be performed by dissolution from sacrificial electrodes and redeposition onto a "cleanup" electrode.

An inhouse-built multi-potentiostat and an electrical feedback system was used to monitor and control the relative potentials of eight electrodes individually, current pulse and ion concentration conditions, and achieve electrochemical additive manufacturing of CoCrCuFeMoNi HEA of desired compositions. In another embodiment, the in-house multi-potentiostat has been demonstrated to work for five metals (NiCoFeCuMo). To understand the mechanism of alloy deposition, to predict the appropriate deposition conditions, and characterize the deposited materials, the following tasks are considered:

Task 1: Molecular dynamic simulation studies for a fundamental understanding of the complex mechanisms of alloy co-deposition and the short-range order of electrodeposited CoCrCuFeMoNi HEA; Task 2: Experimentation and characterization studies to validate the theoretical predictions and understand the effects of process parameters on the deposited HEA.

High-entropy alloys (HEA) are composed of five or more principal elements. In some embodiments, the HEAs have equal or near-equal molar composition ratios of each of the elements included therein. Table 1 provides a list of some HEAs and their applications. The vast potential for unknown material properties resulting from the countless combinations of elements in high entropy alloying is a potential pathway for novel materials with unprecedented characteristics (such as a simultaneous increase in tensile strength and ductility) or enhanced properties (such as thermal conductivity, diffusivity, and expansion). For example, a HEA composed of CoCrFeMnNi has been shown to have the highest fracture toughness seen in any metal alloy. HEAs with enhanced hardness, wear resistance, and corrosion resistance have already been reported. Existing methods such as casting, mechanical alloying, sputtering, and laser cladding can produce HEAs whose compositions are consistent and uniform throughout. The disclosure herein provides the knowledge to achieve functionally graded compositions of high entropy alloy (CoCrCuFeMoNi) through voxel-by-voxel material deposition by electrochemical additive manufacturing (ECAM) process. ECAM is a novel method of additive manufacturing (AM) of metal parts at room temperatures. The present inventor, in his preliminary studies, has demonstrated the feasibility of multi-material (Cu—Ni) deposition by ECAM.

TABLE 1

Examples of HEAs used in various applications

| Alloy | Properties | Applications |
|---|---|---|
| $NiCo_{0.6}Fe_{0.2}Cr_{1.5}SiAlTi_{0.2}$ | High Hardness; Heat resistant | Turbine Blades |
| $AlCoCrFe_{1.5}Mo_{0.5}Ni$ | Wear and oxidation resistant; Very high temperature softening | Brakes |
| $(Al_{0.34}Cr_{0.22}Nb_{0.11}Si_{0.11}Ti_{0.22})_{50}N_{50}$ | Sharp; Oxidation resistant; Strong | Hard Coatings |
| AlCrFeMnNi and AlCrCuFeMnNi | Corrosion resistance | Magnetic, photo-electronic, thermoelectric and fuel cell materials |
| $(MgCoNiCuZn)1xLixO$ | Super conductivity | Batteries |
| AlCoCrFeNiTi | Toughness; High tensile strength; High fracture strength | Nonstick injection molding; compression molding and glass lens molding |
| $AlCoCrFeNi_{2.1}$ | Excellent cast ability | Propellers and structural applications |
| $Al_{0.5}CoCrCuFeNi$ | Light weight | Aerospace |
| NbSiTaTiZr | Chemical stability; High structural stability | Electronic parts |
| (AlCrTaTiZr)Nx | Good hardness; Creep resistance | Coatings for tribological applications |
| $NbCrMo_{0.5}Ta_{0.5}TiZr$ | Low density | Aerospace |

TABLE 1-continued

Examples of HEAs used in various applications

| Alloy | Properties | Applications |
|---|---|---|
| $Al_{0.5}CrFe_{1.5}MnNi_{0.5}$ | High wear and softening resistance, high hardness | High temperature structural applications |

Current State of Understanding of Electrodeposition and the Knowledge Gap

Multi-Material Electrodeposition

Electrodeposition can be used to structure alloys that are not present in standard metallurgical phases. This allows for greater versatility in controlling texture and other amorphous structural elements that may lead to advantages such as corrosion resistance. It is possible to co-deposit alloys that are immiscible in their molten states and therefore impossible to metallurgically create, such as Ag—Ni or Ag—Co. Recent work in Localized electrochemical deposition has enabled direct and ink-free fabrication of polycrystalline multi-metal 3D structures at micro and nanoscale without any post-printing processes. Non-toxic, non-aqueous and aqueous solvents have been used to dissolve metals which prevent the undesirable formation of oxides/hydroxides. Using a moving electrode, localized electrochemical deposition can be performed by anode-guided electroplating (AGE).

Mechanism of Electrodeposition

Electrodeposition of metals involves four partial reactions: diffusion, charge transfer, chemical reaction, and Crystallization (FIG. 2). These reactions are guided by the initial charge, initial solvation shell structure and energetics, and electronic structure characteristic to the ion and deposition site. Diffusion, the migration of ions from the bulk (point) to the double layer (points η), is driven by the influence of the electric field arising from the applied electrode potentials and diffusive forces within the electrolyte. The exact point where this migration ends (1) depends on the energetics for the ion to start the next set of partial reactions at the interface and is the most energetically-favorable point for the ion to cross the interface, as opposed to 2 or 3. The most recent studies have evaluated the energetics of solvation as the ion nears the surface, but this has been done for a limited amount of metals and only for a surface with a flat topography. Charge transfer refers to the motion of charged particles (ions or electrons) from one phase to another either as an electron transfer via electron tunneling between the ionic reactant and substrate, or as ion transfer across the double-layer. An outer-sphere reaction involves an electron transfer between the substrate and a hydrated ion, whereas an inner-sphere reaction involves both ion transfer to the substrate and an electron transfer to the ion at some point during its crossing. Understanding charge transfer is beneficial in electrodeposition, particularly for the multi-material deposition, as the sequences of charge transfer may vary widely for different species of ions. For example, a Copper ion would possibly need to undergo an intermediate monovalent step, whereas Nickel not only exhibits unfavorable energetics for a direct divalent deposition but also has a highly unstable monovalent step; therefore, its exact charge transfer sequence is yet to be understood. Chemical reaction encompasses the bond-making and breaking mechanisms associated with deposition. Ligands of species other than the solvent, consisting of single or multiple sites, will typically be involved in the deposition reaction. Depending on the species involved, the ion itself may not be directly undergoing the charge transfer—rather, it would first have to chemically transform into an electroactive species that would undergo charge transfer as a whole. This chemical transformation may occur in the hydrodynamic boundary layer or the double layer; the resulting electroactive species may then have to reach the outer Helmholtz plane (OHP) or inner Helmholtz plane (IHP) to undergo charge transfer. The ion may then undergo further changes in properties as it moves along the surface or becomes surrounded by incoming neighbors. Anion concentration and pH tend to play a major role in the deposition, primarily due to complexing. The chemical processes are directly coupled with charge transfer. Charge transfer is dependent on the solvation structure because the work to distort the shell dictates the ability of the ion to approach the substrate near enough for electron tunneling to occur. After approach, the solvating structure then influences the ionic energy levels that dictate whether or not electron tunneling is feasible. For example, the presence of a chloride anion changes the initial copper charge transfer from an outer-sphere to an anion-bridged inner-sphere reaction. The deposition of zinc in a hydration shell alone is energetically difficult and relies on the additional presence of anions to occur. Conversely, solvation structure is dependent on the charge transfer—a shifting ionic charge induces reorganization of the solvent into an energetically favorable state for the given charge. Distortion and loss of the hydration shell are further assisted by repulsion from the induced image charges in the electrode. The substrate also undergoes dehydration—a necessary area of water molecules must break off the metal surface to accommodate the incoming ion. Additional considerations arise for metals such as iron or nickel with reversible potentials below the hydrogen evolution reaction, because hydronium ions discharge at the interface, and a local change of pH and coevolution of the metal with hydrogen occurs that influences the individual metal and overall alloy co-deposition. Crystallization refers to the incorporation of the ion into the lattice after it has crossed the interface. The ion, under the influence of thermal lattice and solvent fluctuations, can undergo any number of surface and edge diffusion pathways (illustrated in FIG. 2 by paths through points η) until a kink is reached, where it is kinematically unable to move. Throughout these steps, the ion is still partially-solvated and partially-charged, so it continues to undergo partial reactions of charge transfer and solvation in response to its surrounding metal and solvent nearest neighbors. The ultimate end state of crystallization, if reached, is inside of the bulk of the metal where it can no longer react.

Challenges in Multi-Material Electrodeposition

Butler-Volmer approach is typically used to predict the resulting current and the extent of deposition in the electrochemical deposition of single elements. However, in a multi-material electrochemical deposition, solutions of metals with disparate Nernst potentials will result in unequal deposit composition, even if the solution concentrations are identical. Also, the current monitoring to predict the deposition behavior becomes less reliable, because, when one of the metals in the solution mixture has a Nernst potential that is low enough to be near the hydrogen evolution potential, then the hydrogen evolution reaction will interfere with the reliability of current monitoring for the entire system. The hydrogen evolution reaction may also cause unwanted hydroxide or underpotential deposition. When ions of different valencies are present in equal concentrations in the solution, the limiting current is restricted to that of the metal with the higher valency. Certain metals, due to their structure and solvation behavior, are highly dependent on anions or complexing agents to deposit. For example, the Zn electronic shell structure makes it reliant on anion interaction or controlled pH levels to deposit. Noble metals tend to rely on complexing agents to remain in a stable solvated form—in this case, the addition of just one more metal species can result in a manifold increase in unwanted side reactions with the complexing agent. Changes may also occur in the electrolyte and electrode compositions over time as the deposit grows, which impact the reaction mechanism over time, leading to unexpected deposition behavior. Some attempts have been made to understand the interactions in the electrochemical deposition involving two elements (Ni and Cu). These include characterizing: the partial deposition reactions and currents under applied electrode potentials; the influence of citrate, the typical complexing agent for this mixture, on the current and deposit quality; how pulse voltage parameters influence nickel dissolution during off-time; the influence of agitation on copper deposition due to its mass-transport-controlled nature; and the influence of total applied current on the partial current densities, plating efficiency, and composition using an electrochemical stripping technique. Attempts have also been made to find the ideal potential to simultaneously balance the more competitive deposition of copper over nickel while also avoiding the hydrogen evolution regime using a selection of potential, concentration, pulse, and agitation parameters. Increasing the number of deposition materials to three or more elements as in the case of ECAM of HEAs such as AlCrCuFeMnNi would significantly increase these challenges.

Knowledge Gap

The proposed multi-material electrodeposition for functional alloying by the ECAM process will use a more dynamic and localized electrochemical environment than seen in the literature, which has primarily studied non-localized plating of different HEA compositions over a substrate. The ECAM system for functional alloying will consist of the tool, substrate, sacrificial electrodes, and dynamically-controlled solution. This requires considering the geometrical effects of the electrodes and their placement and dynamic control over the solution composition, and may further involve adding electrolyte mixing operations or a "cleanup" electrode, which would be an auxiliary electrode on which ions from solution can deposit on to controllably reduce concentration. In some embodiments, a "cleanup" electrode would be a separate electrode and role from the actual part being deposited and the substrate to which it is growing on. Additionally, the substrate is not of a fixed geometry—for the functional alloying process in additive manufacturing, the substrate is a growing freeform shape built of regions of custom compositions. This requires an intricate understanding of how the metal-solution interface behaves under different alloy structures and solution compositions encountering one another. Overall, the complexity that is already inherent in the deposition of the alloy under a fixed, uniform environment will be sharply increased by this extension to additive manufacturing. The disclosure herein provides knowledge on how the nature of depositing each constituent metal species can be harnessed to achieve functionally graded high-entropy alloyed parts by electrochemical additive manufacturing.

Preliminary Studies

Simulation Studies

Figure 3:
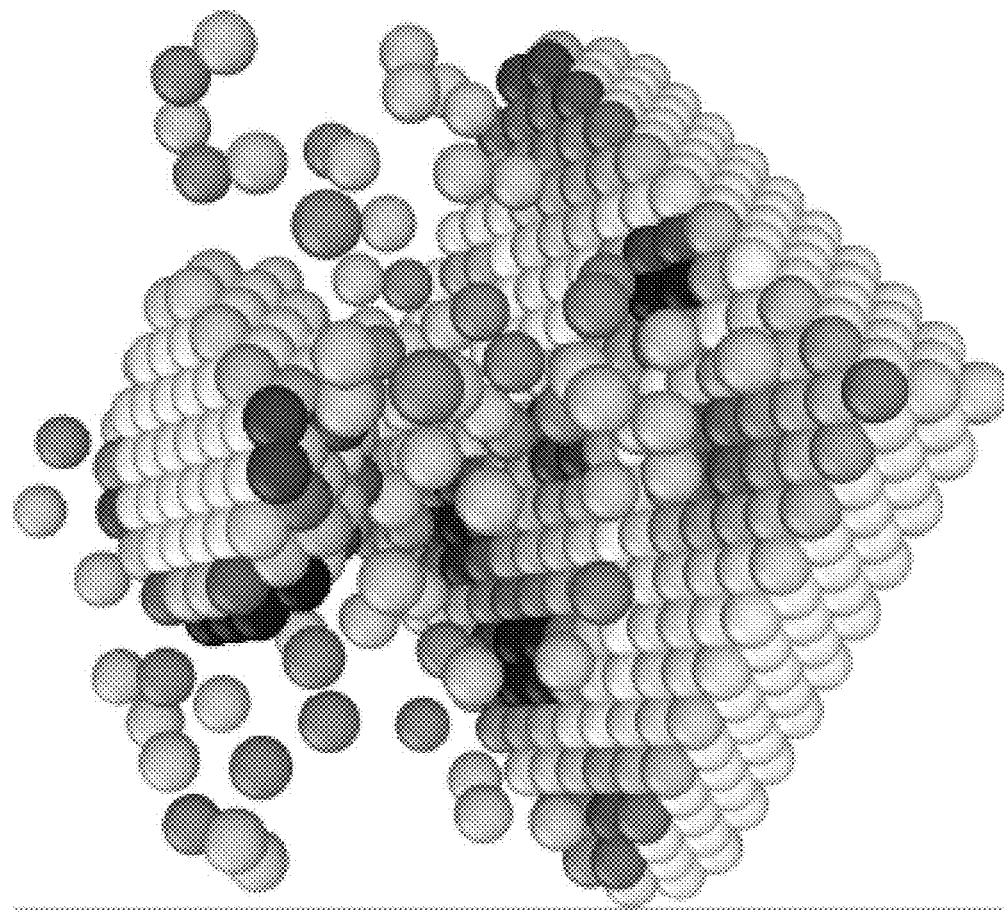
FIG. 3 is an illustration of a constant potential quasi-deterministic MD simulation.

The present inventor is active in using molecular dynamics simulation to study fundamental aspects of materials interactions in advanced manufacturing processes. Two different studies on molecular dynamics simulation have been done by the present inventor to understand electrodeposition at the atomic level. The first study was a hybrid classical-quantum method using the electron force field program, eFF, driven by a custom auxiliary code to study the effects of current, concentration, and interelectrode gap. It assumed a fixed substrate and did not account for specifics of metal motion. The incoming ion primarily interacted with the electrons and not any metal-specific reactions. The second study that was an extension of the Langevin dynamics method, was a quasi-deterministic simulation shown in FIG. 3, using explicit, constant-potential and fluctuating-charge electrodes with explicit anions and cations in an implicit solvent bath. While these preliminary simulations addressed localization, overpotential, and electric field, finer details of solution interactions and charge transfer that are essential to understand in the deposition of HEA elements are yet to be investigated. Proposed simulation activities to understand these issues are discussed in Task 1 (below).

Experimentation

The present inventor has been studying various aspects of single material electrodeposition by ECAM that include feasibility, porosity, cloud-based control, liquid marble deposition, and binding layers of copper powders. The present inventor's preliminary experiments on Ni—Cu deposition has revealed that limiting the concentration of the more active cation species (Cu) would enable the deposition of an alloy of Nickel-Copper. High current density deposition with diffusion-limited copper deposition was used to achieve variations in Ni—Cu alloy composition. The ratio of Ni:Cu in the alloy was varied between 2 to 14. A custom-built multipotentiostat system shown in FIGS. 4A and 4B was built in the preliminary studies. The developmental work to augment this ECAM system for the proposed multi-material deposition of high entropy alloy (CoCrCuFeMoNi) has already been completed. A preliminary demonstration of Fe, Co, and Ni electrode control using the in-house built system is shown in the voltammogram plots in FIGS. 5A, 5B, 5C, 5D, and 5E. This augmented experimental system will be used in the experimental studies proposed in Task 2, indicated above.

Tasks performed in preparation and analysis of the reduction of the invention to practice including simulation and experimental studies and the specific research tasks performed to achieve the research objective of the invention are described below:

Task 1: Simulation Studies to Establish a Fundamental Understanding of Multi-Material Deposition Subtask 1.1 Understanding the Reaction Mechanisms in Multi-Material Deposition.

The goal of this subtask is to understand the reaction mechanisms for varying ion-substrate configuration in the electrodeposition of CoCrCuFeMoNi. This involves simulation of (1) the initial ionic structures of each species depositing into the alloy and (2) the electronic structures of solid metal substrates.

Figure 6A:
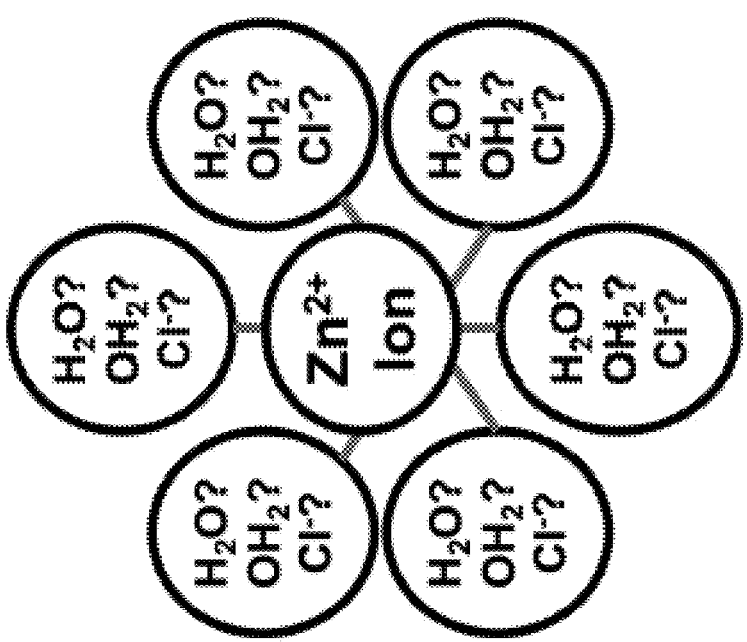
FIGS. 6A and 6B are illustrations of multiple possibilities of initial chemical and electronic structures of zinc ion in an electrolyte bath.
Figure 6B:
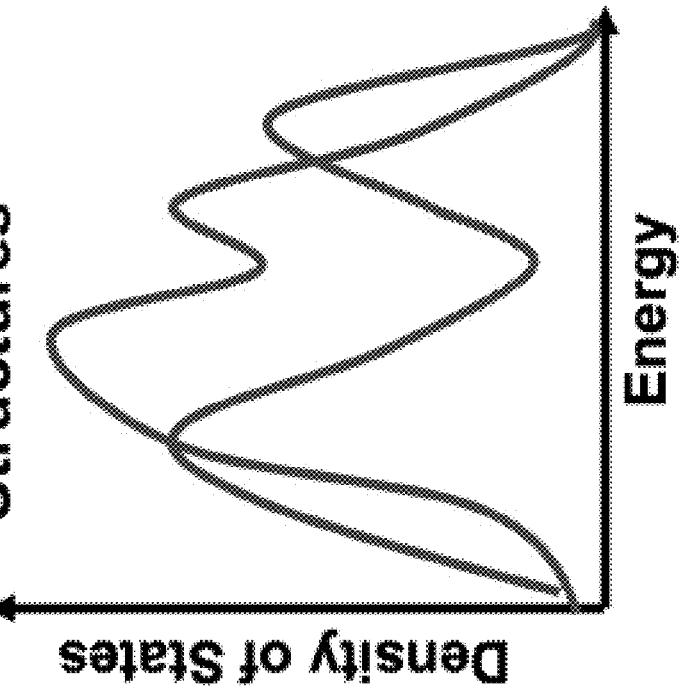

Simulation of initial state of aqueous ions: Depending on the metal ion, pH, and anion species involved, the metal cation may also have ligands of anions or complexing agents in addition to the primary solvation shell; an example for the multitude of possibilities of the zinc ion in a solution with varying pH and chloride concentration is shown in FIGS. 6A and 6B. Initially, the expected structures for each element in a given electrolyte bath will be obtained from the literature. Subsequently, using the density functional theory (DFT) calculations of the orbital density of states (DOS) the initial structure of the ion's valence orbital will be determined to understand how it will interact, overlap, undergo electron transfer, and bond with the substrate band structure upon approach.

Figure 7B:
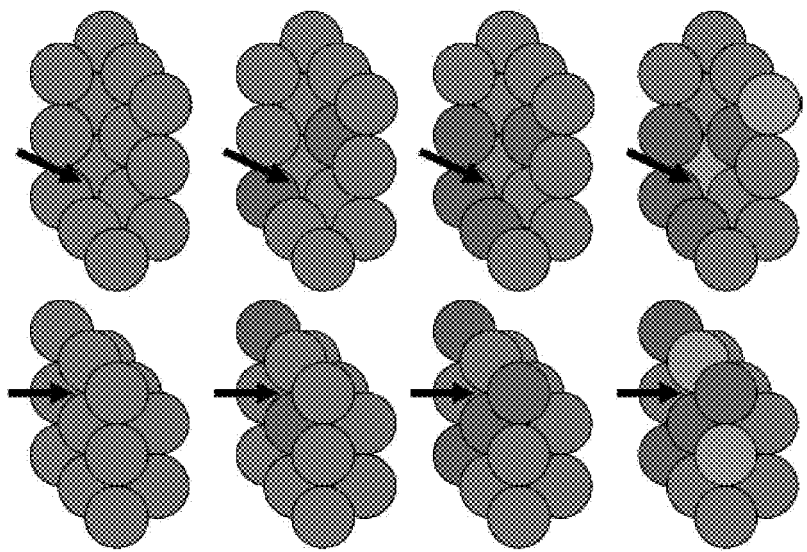
FIGS. 7A and 7B are illustrations of possible configurations and compositions of HEA substrate.
Figure 7A:
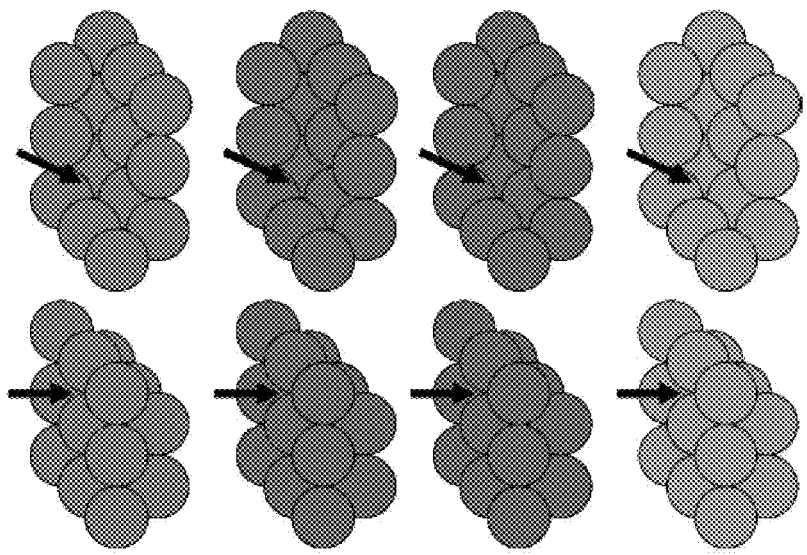
Figure 8:
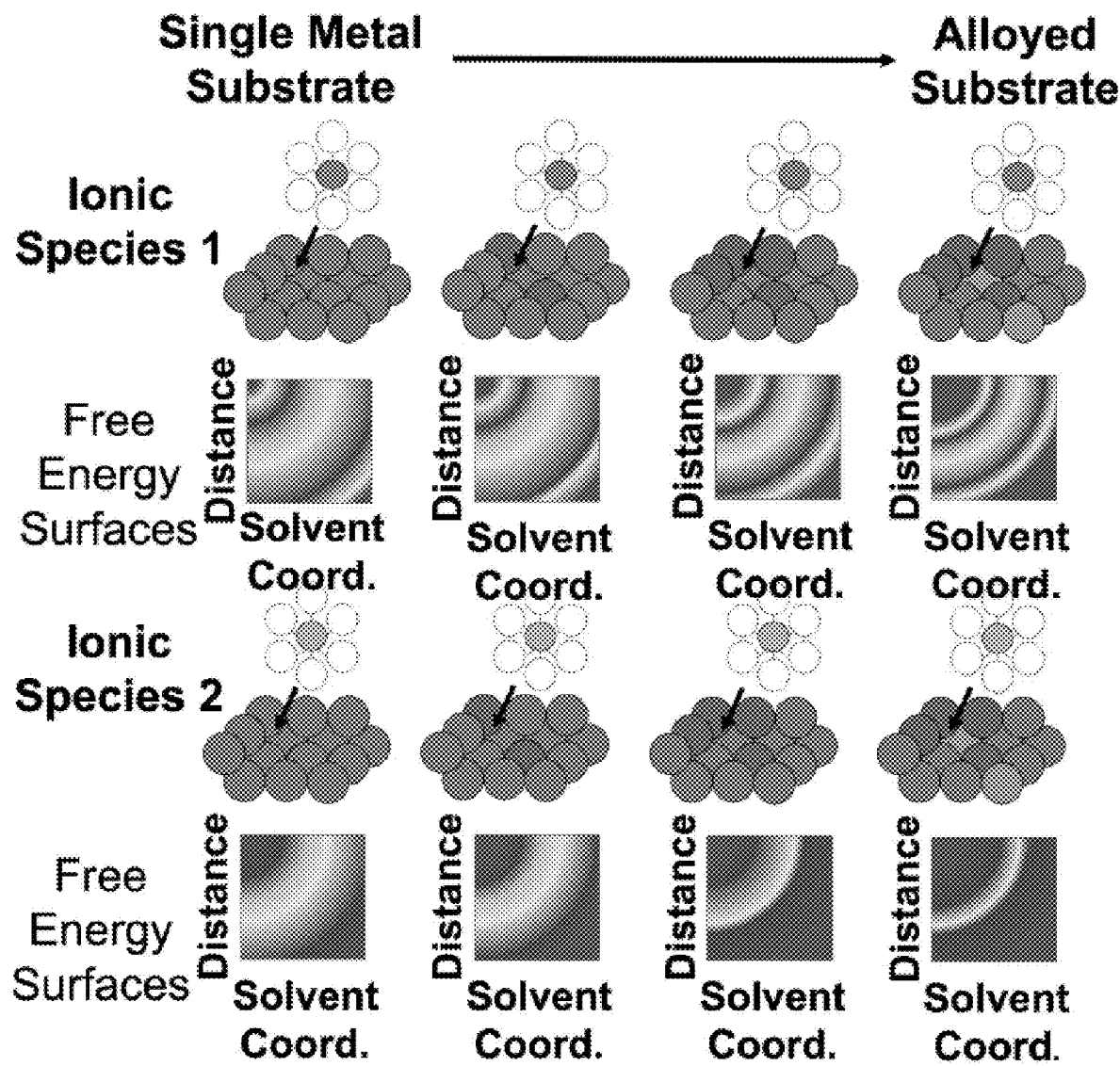
FIG. 8 is a tabulation of free energy surfaces for deposition of varying ions on varying substrates.

Simulation of electronic structures of solid metal substrates: Knowledge of the expected valence band structure of the solid metal substrate for varying combinations of metals species and topographical structures will be acquired as illustrated in FIGS. 7A and 7B using density functional theory-based calculations similar to reports on calculating the band structures of a flat substrate site of a solid, single-species metal substrate for individual silver, copper, and zinc systems. This method was used to extend calculations of metal valence band structures to enable the modeling of high entropy alloys. This involved extensive calculations of the band structures for individual metal systems that compose the CoCrCuFeMoNi alloy. Samples ranging from flat to structured (containing edge and kink features) were calculated. Calculations were then extended into flat and structured alloys. These extensive calculations were aggregated into an interposable lookup table for use in the subsequent MD simulation. If an ion is approached a structured site of multiple elements, then the valence band structure of that site could be looked up without having to re-calculate the band structure during the simulation. Understanding the reaction mechanisms for varying ion-substrate configuration involves knowing how the electronic and hydration structures of each depositing species change in a coupled manner as the ion travels through the double layer and discharges onto the substrate. As the ion approaches and adsorbs, changes to its valence orbital structure occur due to interaction with the valence band structure of the solid metal. The behavior for different ion-substrate species combinations involved in the deposition of CoCrCuFeMoNi alloy were studied. The orbital overlap between the DOS of each phase during ion approach gives the energetics of electron transfer. This has been quantified for specific metal systems in the form of DOS plots at varying distances and resulting free energy surfaces of the reaction. From the free energy surfaces, it is possible to distinguish initial, intermediate, and final states in the reaction. Saddle points between the minimums indicate activation energy. The tabulation for metal substrates will further be extended to the influence of each substrate on the valence structure of incoming ions of each species in the alloy. An example of sequentially tabulating free energy surfaces under changing ionic and substrate species selections is illustrated in FIG. 8. This tabulation were used to create a reactive potential algorithm in subtask 1.2.

Figure 9:
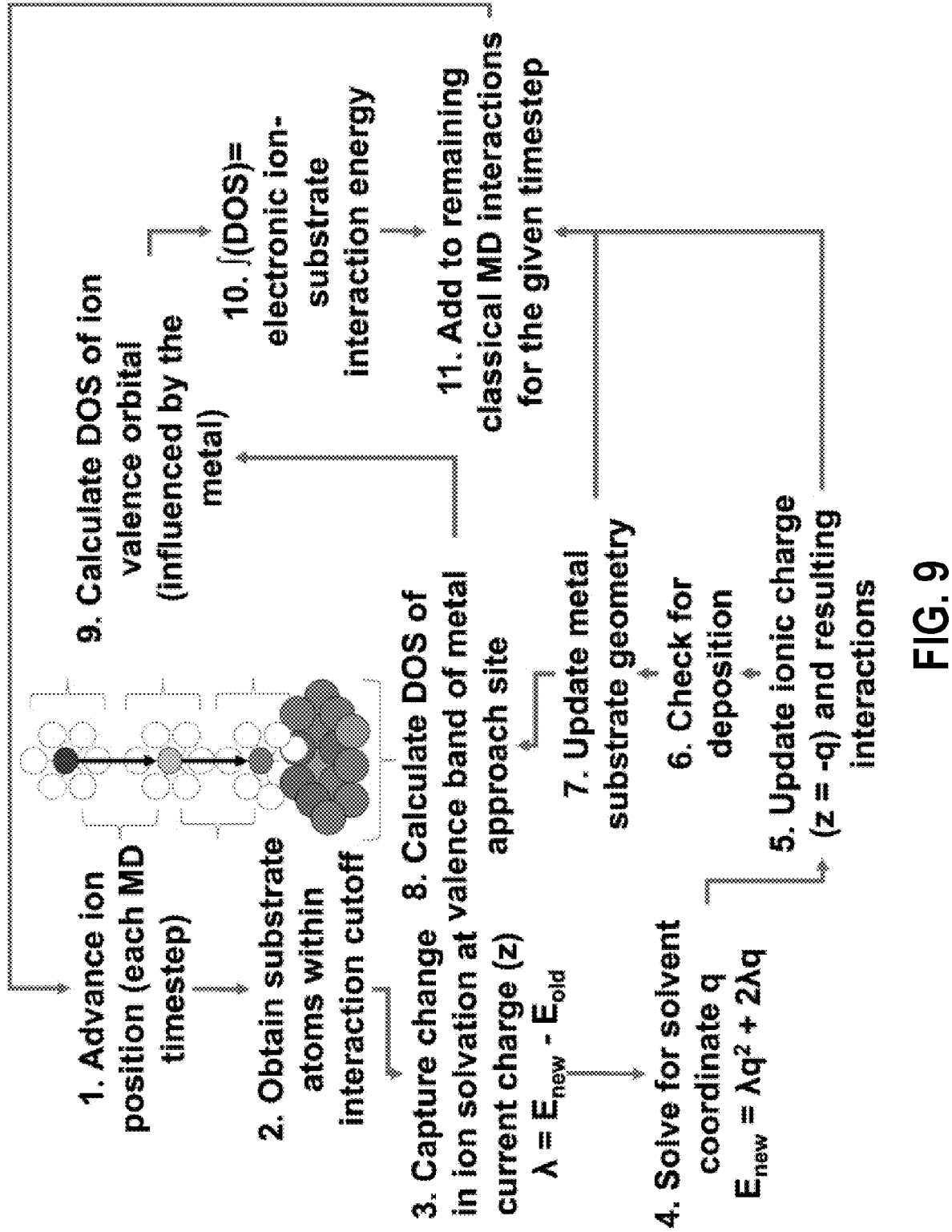
FIG. 9 is a flowchart of a reactive potential algorithm for depositing an ion.

Subtask 1.2 Creating a Reactive Potential Algorithm for Multi-Material Deposition The goal of this subtask was to create a reactive potential algorithm for each ion as it approaches a site on the substrate of varying topographical structure and chemical composition, as summarized in FIG. 9. The steps involved in the proposed scheme for each aqueous ion is listed below:

1. At the end of each MD timestep, check if an ion is within interaction distance of any of the substrate atoms. The reactive potential algorithm will be initialized at the given distance and solvent configuration of the ion at this point.

2. Gather all substrate atoms within the cutoff radius of interaction with the depositing ion.

3. Evaluate the energy of relaxation $\lambda$, which is the change in solvation energy from the previous timestep.

4. Solve for the solvent coordinate q, which represents the negative value of the charge associated with an ion in equilibrium with the current solvent structure.

5. Update the ionic charge, which is the negative of the solvent coordinate q, and the resulting Coulomb interaction energy with surrounding species.

6. Check if the ion is part of the substrate. This would be associated with a near-zero charge and hydration structure that do not change beyond a specified threshold of energy for a specified number of timesteps, indicating the ion has reached the final discharged minimum region in the free energy surface of reaction. Work will involve determining the energy and timestep thresholds that convey the reaction accurately in the simulation. This will require correlation with the free energy surfaces obtained in subtask 3. When the ion undergoes this switch, it begins to interact as a particle with the solid metal potential.

7. Update the substrate geometry in accordance with any new ions deposited in step 6.

8. For each remaining aqueous ion, calculate the density of states of the given selection of substrate atoms within its interaction cutoff, accounting for the updated substrate geometry in step 7.

9. Calculate the density of states of the ionic valence orbital, as influenced by the substrate atoms at the given separation.

10. Integrate the density of states profile to give the interaction energy between the ion and interacting substrate atoms. The integrated DFT-calculated electronic interaction will be used in the following MD timestep to evaluate the force between the ion and electrode arising from electronic interactions.

11. Add the updated charge and resulting Coulomb interactions with the solvent and updated electrode (steps 5 and 7) and electronic ion-substrate interaction force (step 10) to the respective species for the next MD timestep.

Subtask 1.3 MD Simulation of Multi-Material Deposition

Figure 10:
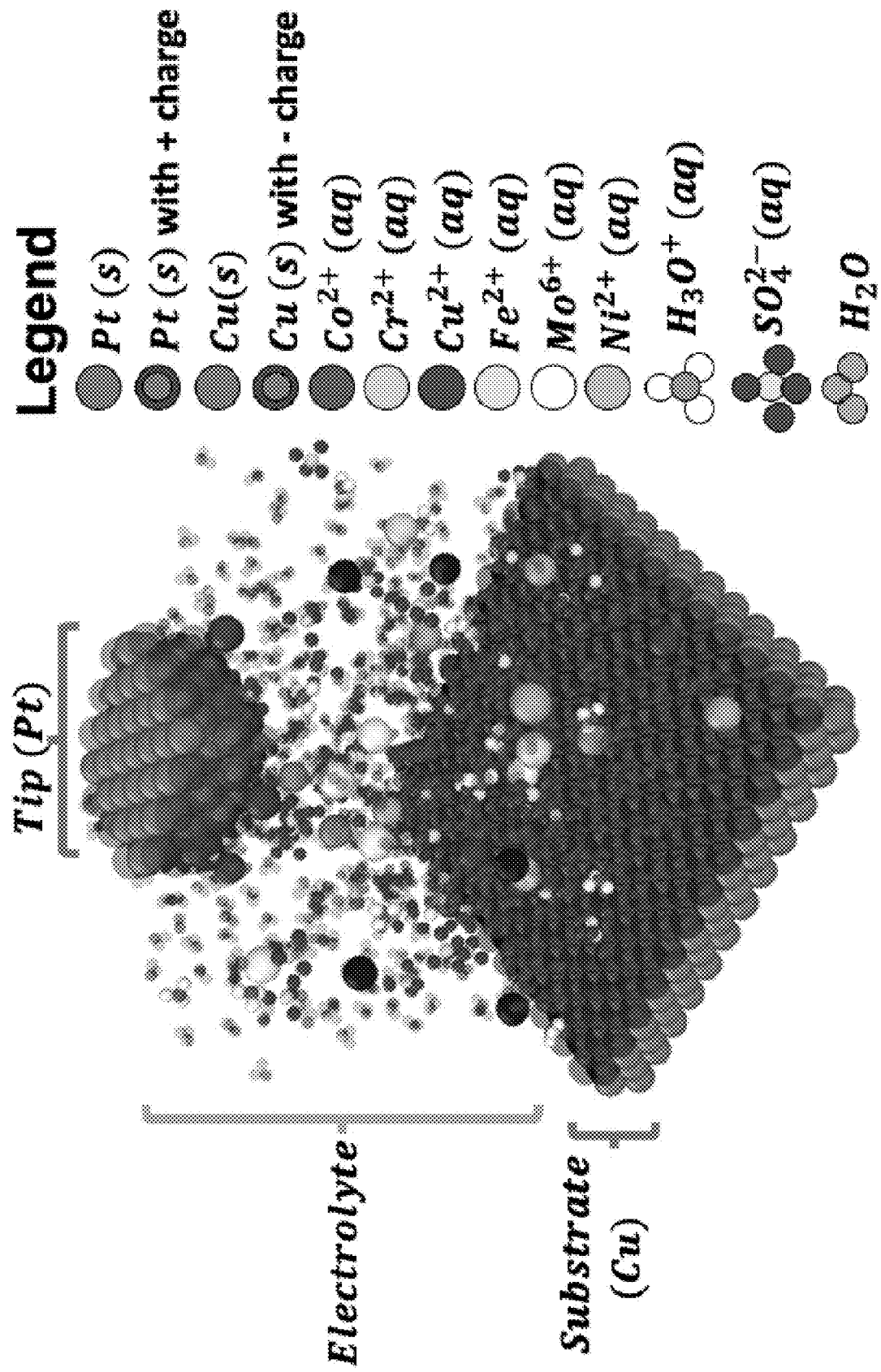
FIG. 10 is an illustration showing molecular dynamics simulation setup for a multi-material deposition.

The goal of this subtask was to simulate the deposition of CoCrCuFeMoNi alloy. The MD simulation included mostly classical potentials, with a focus on describing interfacial ion-substrate interactions and dynamic charge transfer with the reactive potentials generated from subtask 1.2. Table 2 lists parameters and levels to be studied in this subtask, and an example simulation setup for a CoCrCuFeMoNi HEA is shown in FIG. 10. The partial current densities in the multi-ion environment will be established as a function of the surrounding composition and applied potential as $i_{Cu2+}$= f(t, $c_{Cu2+}$, $c_{Ni2+}$, $X_{Cu}$, $X_{Ni}$, $i_{Ni2+}$, E(t), and $i_{Ni2+}$=f(t, $c_{Cu2+}$, $c_{Ni2+}$, $X_{Cu}$, $X_{Ni}$, $i_{Cu2+}$, E(t)) for example, for copper ($i_{Cu2+}$) and nickel ions ($i_{Ni2+}$). Expected input parameters include time t, individual ion concentrations $c_{Cu2+}$ and $c_{Ni2+}$, substrate composition represented in the mole fractions $X_{Cu}$ and $X_{Ni}$, and applied substrate potential E(t). Additionally, a coupled relationship is expected, where one current density affects the other. This will be further extended to a system of coupled equations in the deposition of CoCrCuFeMoNi. Further, the partial current density values obtained from the MDS of each metal species occurring across the substrate topography over time will be scaled up to larger-scale current densities, current efficiencies, and total current values. The aggregate current behavior will be correlated to the deposited alloy composition and morphology and subsequently will be validated with experimental studies.

TABLE 2

MD simulation parameters and levels

| Parameter | Levels |
| --- | --- |
| Metal ion concentration (M) | .01, .02, .03, .05, .1 |
| Substrate Species | Co, Cr, Ni, Mo, Cu, Fe |
| Anion species | Chloride, Sulfate, Sulfamate |
| Acid concentration with same anion | ¼, ½ (ratio to total metal concentration) |
| Substrate voltage (V) | −1.4, −1.2, −1.0, −8.0 |
| Interelectrode voltage (V) | 1, 2, 3, 4, 5 |
| Interelectrode gap (Å) | 5, 10, 15, 20 |
| Tool radius (Å) | 5, 10, 15, 20 |
| Pulse duty cycle | 25%, 50%, 75%, 100% |
| Pulse frequency (kHz) | 0 (DC), 1, 10, 100, 1000 |

Task 2: Experimentation

Figure 11:
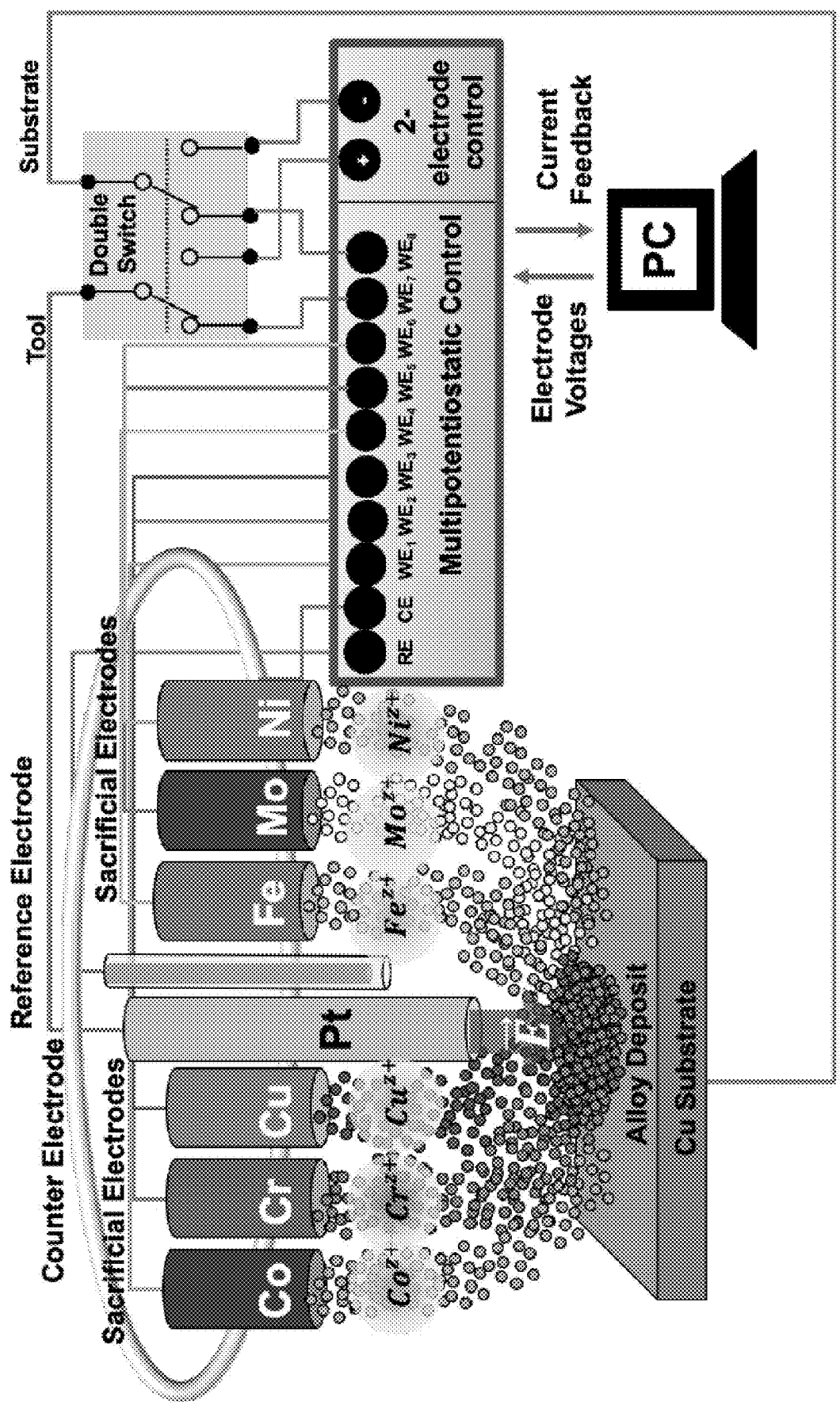
FIG. 11 is an illustration of a system configuration for a multi-material deposition.

In this task, the CoCrCuFeMoNi high-entropy alloy were electrodeposited from a bath of variable ion concentrations. The electrolyte will initially consist of a "blank" solution of zero metal ion concentration supplying anions, such as sulfuric acid. Solution modification will be achieved by controlled dissolution of sacrificial working electrodes using the custom-built multi-potentiostatic system illustrated in FIG. 11. The sacrificial electrode voltages will be biased in a controlled manner to drive deposition, dissolution, or zero net flux of their corresponding ions into the solution. The ECAM depositing tool and substrate will also be electrodes in the cell, with the option to configure them using the common multipotentiostatic control, or as an independent two-electrode circuit.

Figure 12:
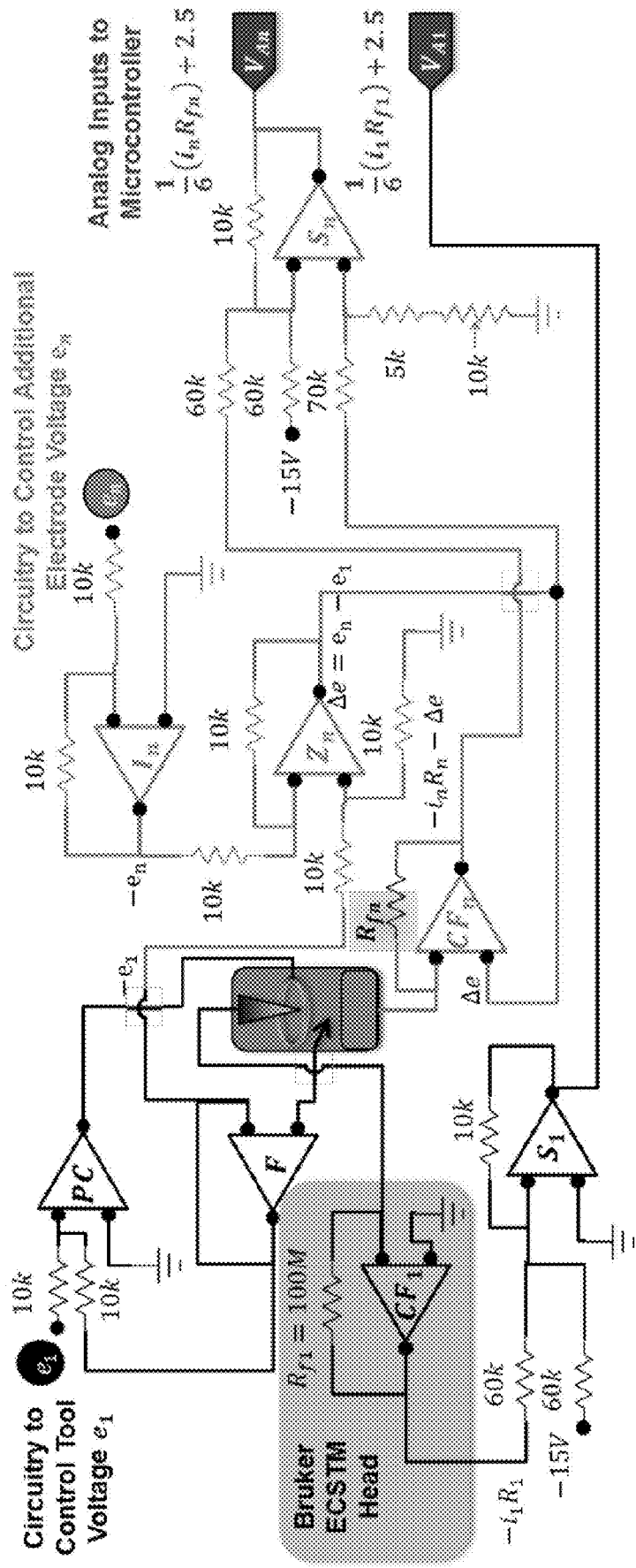
FIG. 12 is a schematic of an architecture for potentiostatic control of multi-material deposition.

Subtask 2.1 Process Monitoring and Control:

The goal of this subtask was to establish a programmatic control of all electrode potentials to maintain desired behavior at each electrode throughout the functional alloying process. The current configuration uses an "adder" architecture, as seen in the schematic in FIG. 12, which will keep the first working electrode $WE_1$ at virtual ground, the reference electrode at $-e_1$, and the remaining working electrodes $WE_n$ at floating potentials $\Delta e_r = e_n - e_1$. The left part of the circuitry covers the overall potentiostatic control over the reference, counter, and first working electrode. The right side of the FIG. 12 covers the independent circuitry to be used for each additional working electrode. The heart of the proposed potential control for each working electrode $WE_n$ is its current follower $CF_n$, which must be able to source or sink the current through the electrode, as well as convert it to a measurable voltage. This requires selection of an op amp appropriate to each electrode's expected (aided by simulation) operating range of current, and selection of a feedback resistor $R_{fn}$ which converts the current to a measurable voltage within the power supply range.

Figure 13:
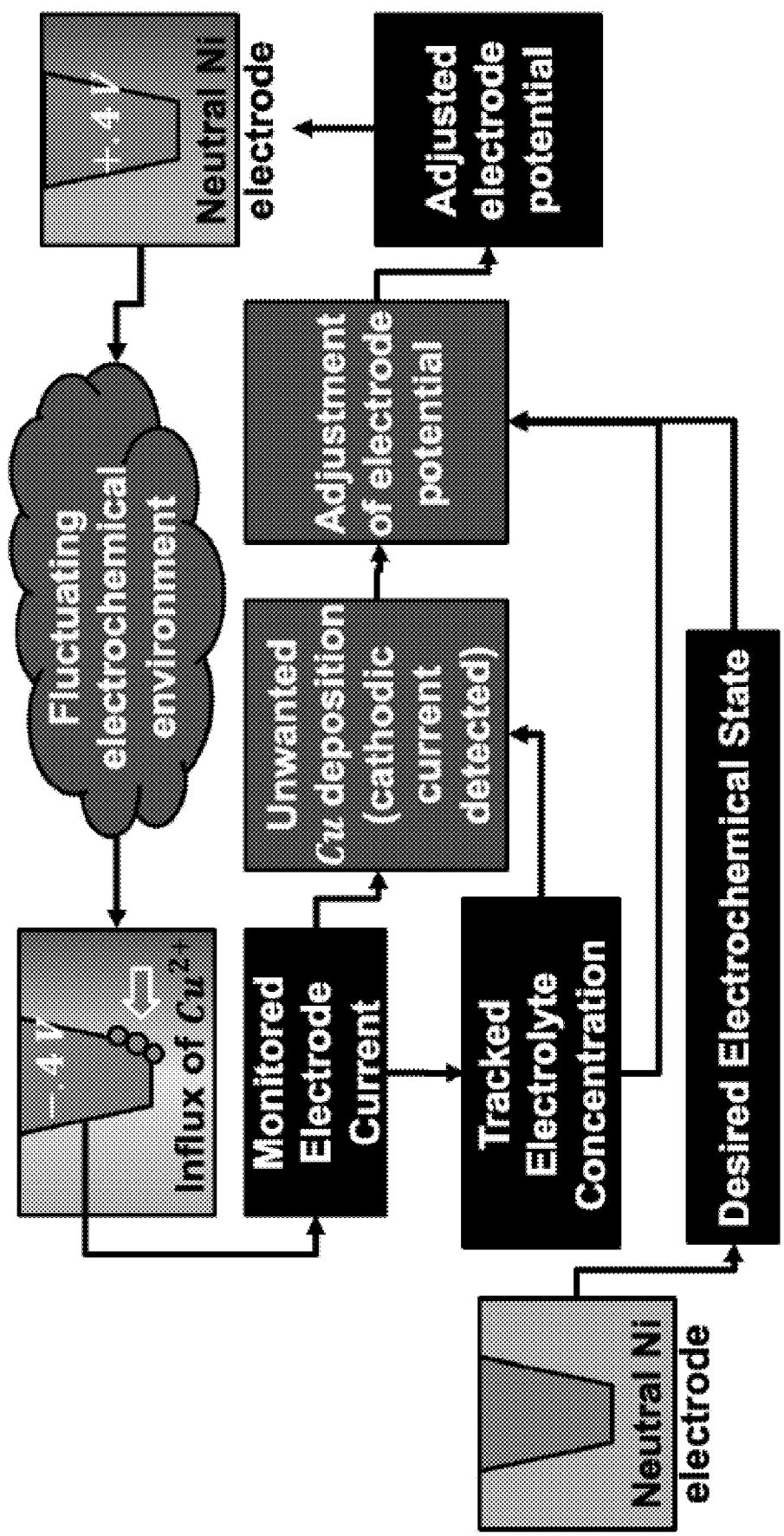
FIG. 13 is a flowchart of an example of multipotentiostat control algorithm to maintain neutral behavior at an electrode in the presence of a metal cation.

Because the solution composition will dynamically change during the multi-material electrodeposition, the Nernst potentials at each electrode will also change. For example, a substrate electrode held at a potential that initially results in neutral behavior may begin to dissolve in an undesirable fashion as the solution concentration changes around it. Alternatively, the unwanted deposition of nickel or copper may occur on a sacrificial electrode that intends to dissolve or stay neutral. The system therefore needs to keep track of the solution concentration and adapt the applied potentials to maintain desired reaction at each electrode over time. The in-house-built multipotentiostat will be used for the programmatic control of each electrode's potential in the solution and give the resulting current through each electrode as feedback for process monitoring. An example of the flow behind holding a sacrificial nickel electrode at neutral behavior under a changing environment is shown in FIG. 13. The polarization curves of all electrodes (tool, substrate, and sacrificial) under a variety of electrochemical input parameters will be captured in this subtask and the current, plotted as a polarization curve over a potential sweep, will indicate where deposition, dissolution, or neutral behavior occurs. This data will then be saved to the system such that desired behavior of electrodes can be maintained by multipotentiostatic control. Particular regions of interest include neutral behavior for the tool, the range from neutral to deposition behavior for the substrate, and the range from neutral to dissolution behavior for the sacrificial electrodes. Substrates and solutions of different metal compositions will be studied under varying combinations (Table 3). Additionally, the tool and substrate electrodes will be switched between the multipotentiostat and 2-electrode configurations.

TABLE 3

List of parameters for potentiostatic sweep of electrodes of elements constituting CoCrCuFeMoNi alloy

| Parameter | Levels |
| --- | --- |
| Electrode material | Platinum tool, Cu substrate; and Co, Cr, Cu, Fe, Mo, or Ni sacrificial electrode rods |
| Metal ion concentration (M) of Co, Cr, Fe, Cu, Ni | .05, .10, .15, .20 |
| Anion species | Chloride, Sulfate, Sulfamate |
| Voltage sweep range (V) | −5 to +5 V for all electrodes |

Figure 4B:
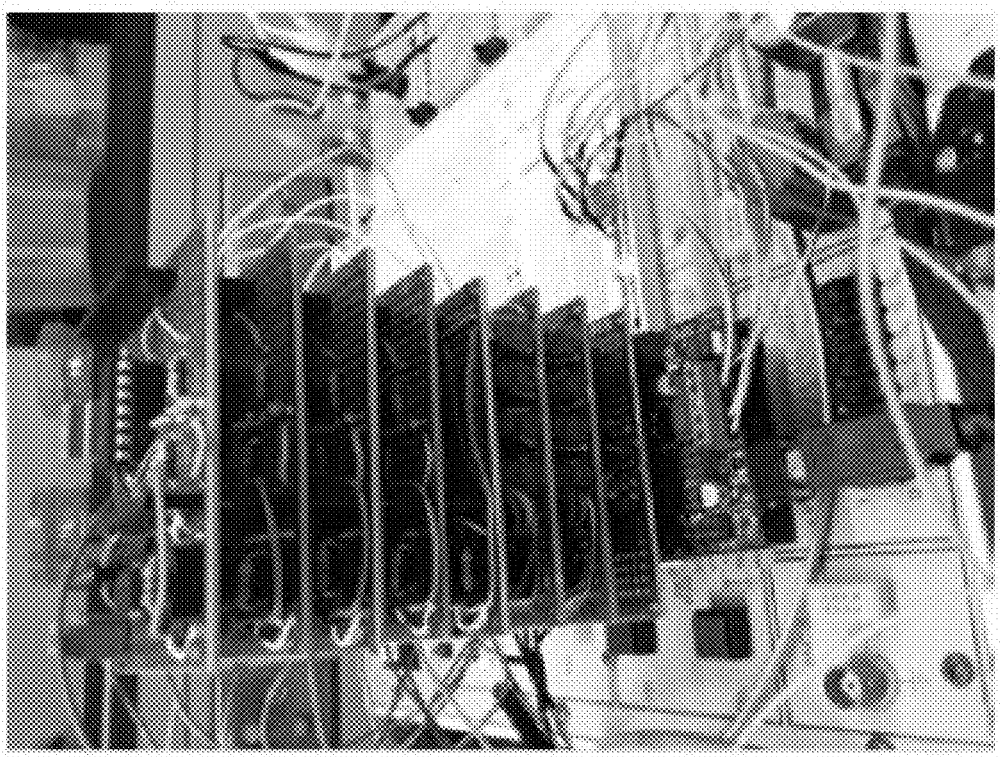
FIGS. 4A and 4B are a set of photographs of a in-house-build experimental system (FIG. 4A), and a multipotentiostat and motor control circuits (FIG. 4B)
Figure 4A:
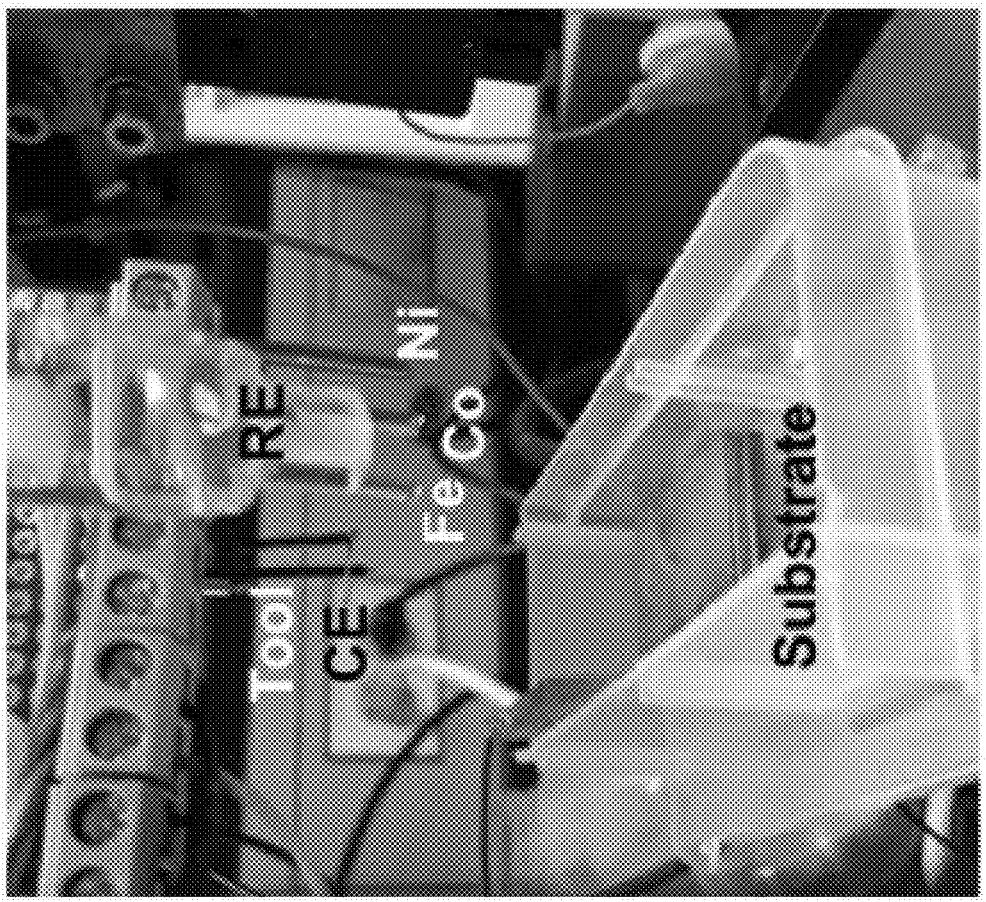
Figures 5A, 5B, 5C, 5D, 5E:
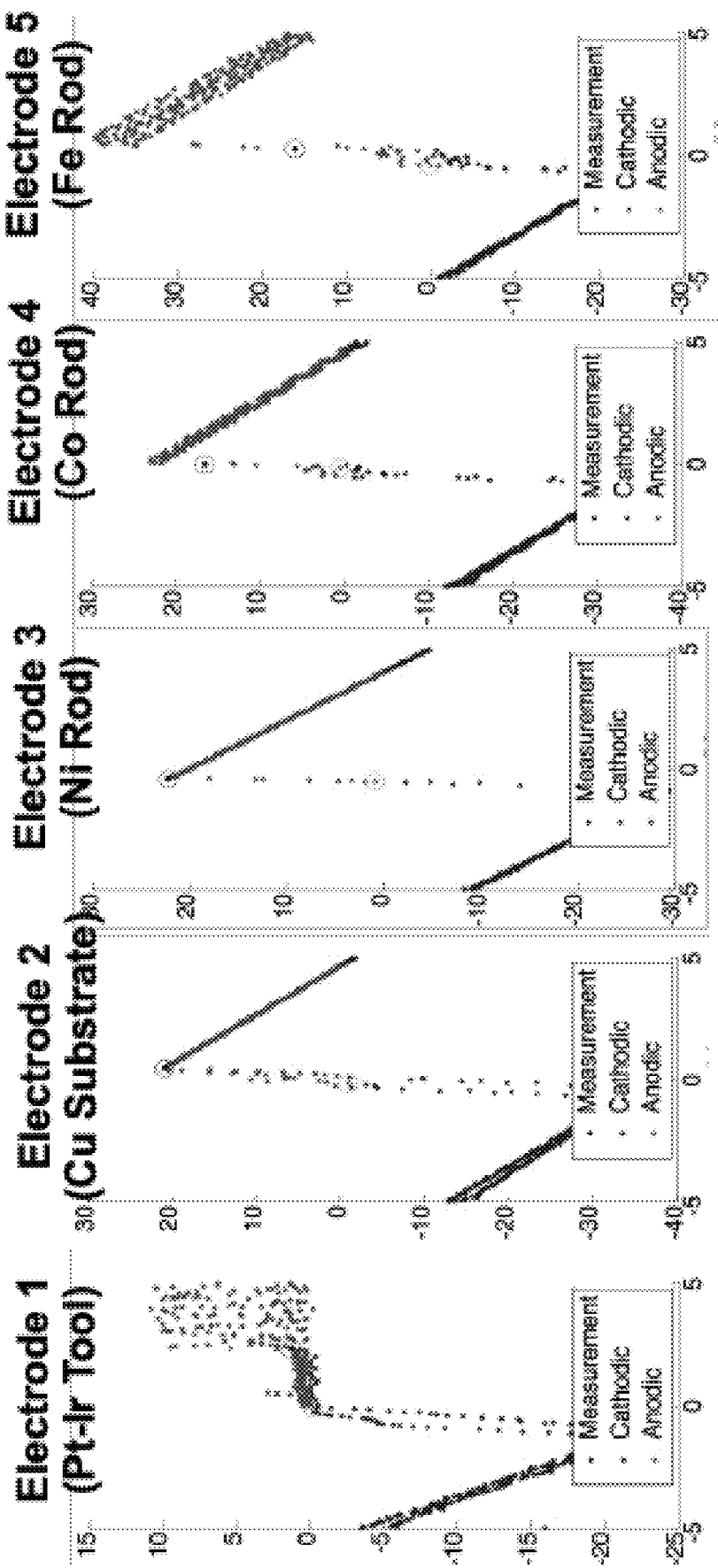
FIGS. 5A, 5B, 5C, 5D, and 5E a set of graphs of independent voltammetric plots for each sacrificial electrode.

Subtask 2.2 Electrodeposition of Multi-Materials:

Extensive experimental investigation to understand the process parametric relationships in the electrodeposition of CoCrCuFeMoNi were conducted in this task using an in-house built experimental setup shown in FIGS. 4A and 4B. Statistical design and analysis of experiments will be employed to minimize experimental effort and identify the significance of each process variable and its interactions. Table 3 lists the input process parameters and levels to be used in a full factorial design of experiments in this task. Moreover, validation of theoretical predictions made in Task 1 will also be carried out in this task. The output current will be monitored using the potentiostat and compared to the computationally-obtained output currents. Additionally, transient current behavior will be linked to input process parameters and output composition, to allow for current behavior to serve as a reliable in-situ monitoring tool to predict the output composition.

Subtask 2.3 Feasibility Study of Functional Alloying of Amorphous Magnetic Microwires:

This subtask focused on proving the feasibility of 3D printing of spatially-tuned amorphous magnetic microwire (AMMW) with the geometrical parameters listed in Table 4.

TABLE 4

Geometrical parameters for the spatially tuned AMMW

| Parameter | Levels |
| --- | --- |
| Height h (μm) | 10, 20, 50, 100 |
| Radius r (μm) | 5, 10, 15 |
| Voxel spacing v (μm) | .1, .2, .5, 1.0, 2.0 |
| Height h (μm) | 10, 20, 50, 100 |

Figure 14:
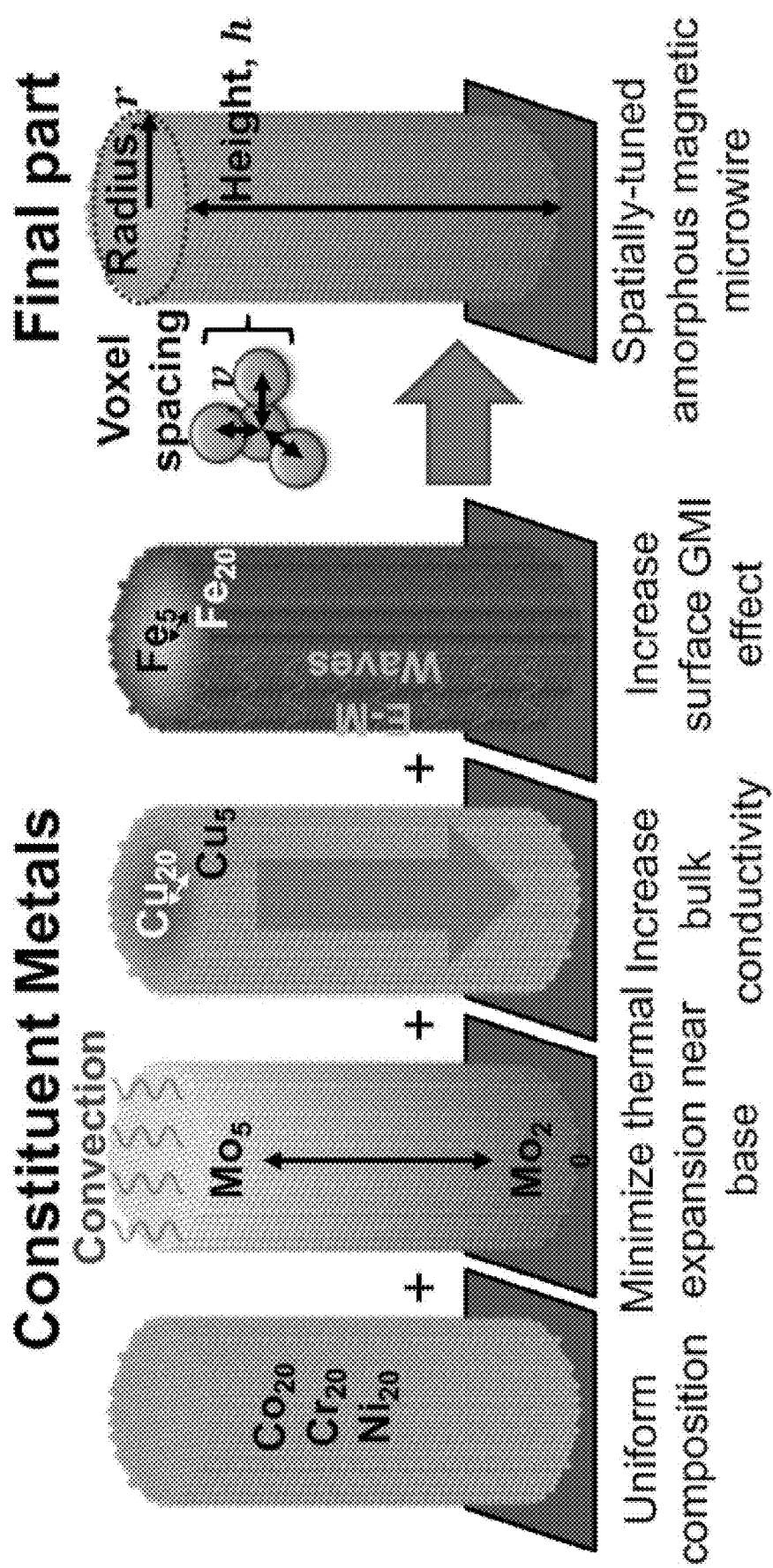
FIG. 14 is an illustration of a functionally graded-amorphous magnetic microwire.

AMMWs are typically 0.8-30 μm in diameter and have several electromagnetic applications due to their unique properties such as magnetic biostability, softness, and the giant magnetoimpedance effect (GMI), which is the reduction of electrical resistance in the presence of a magnetic field. The influence of varying material composition of elements such as Co, Fe, Mn, Cr, Ni and Cu on electromagnetic performance is under extensive, ongoing research. Using HEA compositions to make an AMMW is a promising approach for magnetocaloric refrigeration applications. It was shown that increasing Fe content increased the GMI effect due to the increased magnetic anisotropy associated with the microstructural changes upon increasing Fe composition. In contrast, increase of Co composition was found to result in an increasingly crystalline structure. Increase of Ni composition was also found to counteract the crystalline nature of Co by creating lattice mismatch which influenced magnetic anisotropy. Addition of Cu (which is immiscible with the Fe—Co—Ni elements and forms a supersaturated solid solution) can further increase the GMI effect. Up to 8-10% Mo and 20% Cr may also be alloyed. Studies of alloying Mo have shown its role in reducing thermal expansion. Performance of AMMW can be tremendously increased by the spatial variation of wire composition to alter the skin effect, where the current density generated by the absorbed wave is restricted to outer surface of the part due to high internal impedance to current flow and results in inductive or Joule heating. Skin effect is undesirable in medical applications where probe-tissue contact is present. Thus, certain MRI probes used an intentionally less-conductive surface to reduce current and heat. On the other hand, studies have focused on Joule heating as a desirable behavior that enhances the GMI effect. The proposed functional grading, illustrated in FIG. 14, builds on the reviewed information to create an AMMW with spatially-tuned composition that enhances the GMI, conductivity, and thermal expansion behavior. The stoichiometric ratios have been selected to roughly correspond to the order of those reported in literature. The percentage of Fe will be increased radially towards the surface to increase the GMI effect. The Cu composition will be increased radially towards the center to increase internal thermal and electrical conductivity, and therefore reduce power consumption. Due to the shape of the part, increased heat convection will occur near the tip and leave more heat near the base of the part. To avoid uneven thermal expansion, the percentage of Mo will be increased linearly towards the base of the part. This subtask will create knowledge on the correct sequence, timing, and voltages in which to execute dissolution and deposition of functionally graded parts.

Figure 15:
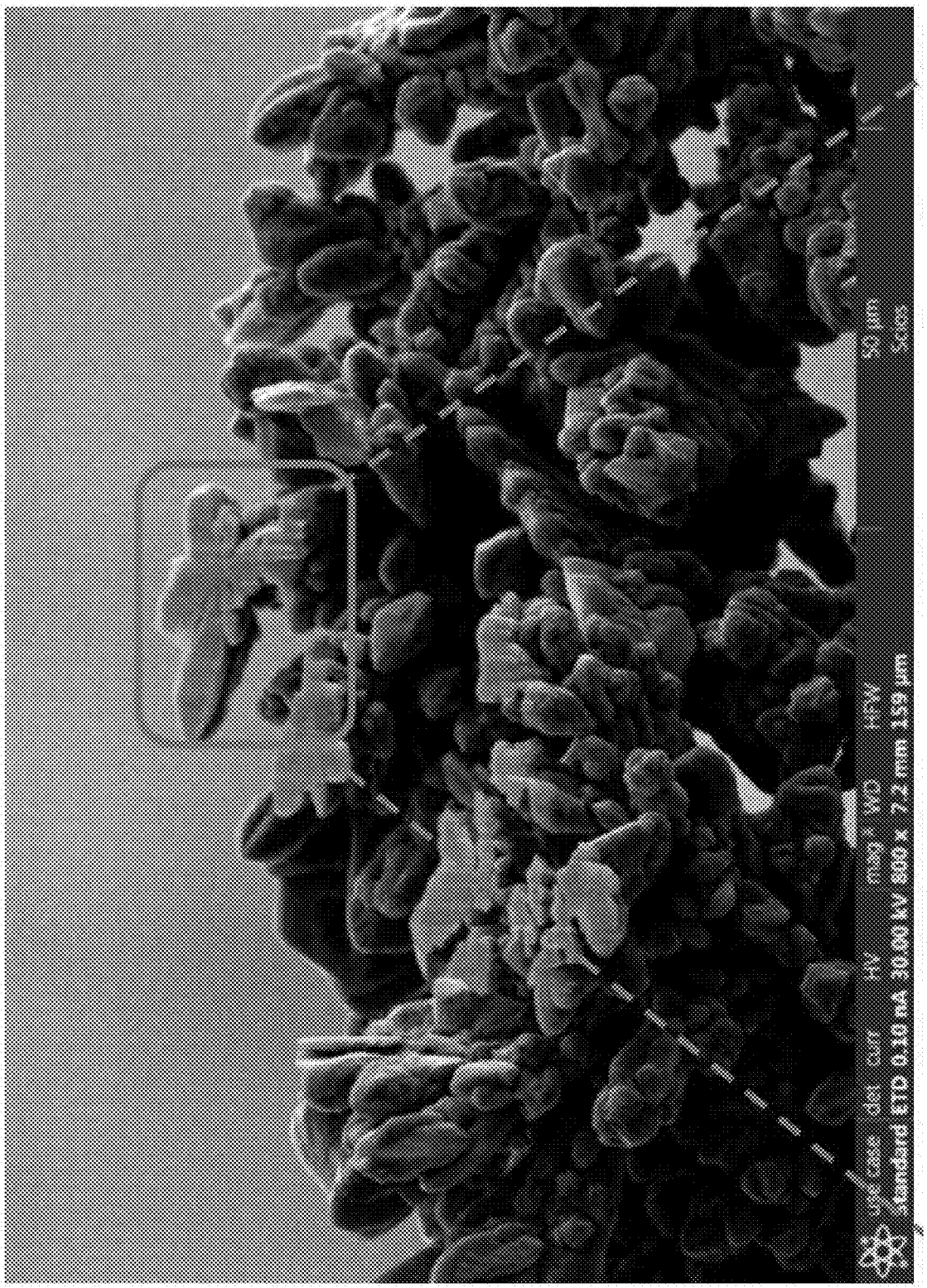
FIG. 15 is a scanning electron microscope (SEM) image of a sample after focused ion beam (FIB) deposition.
Figure 16:
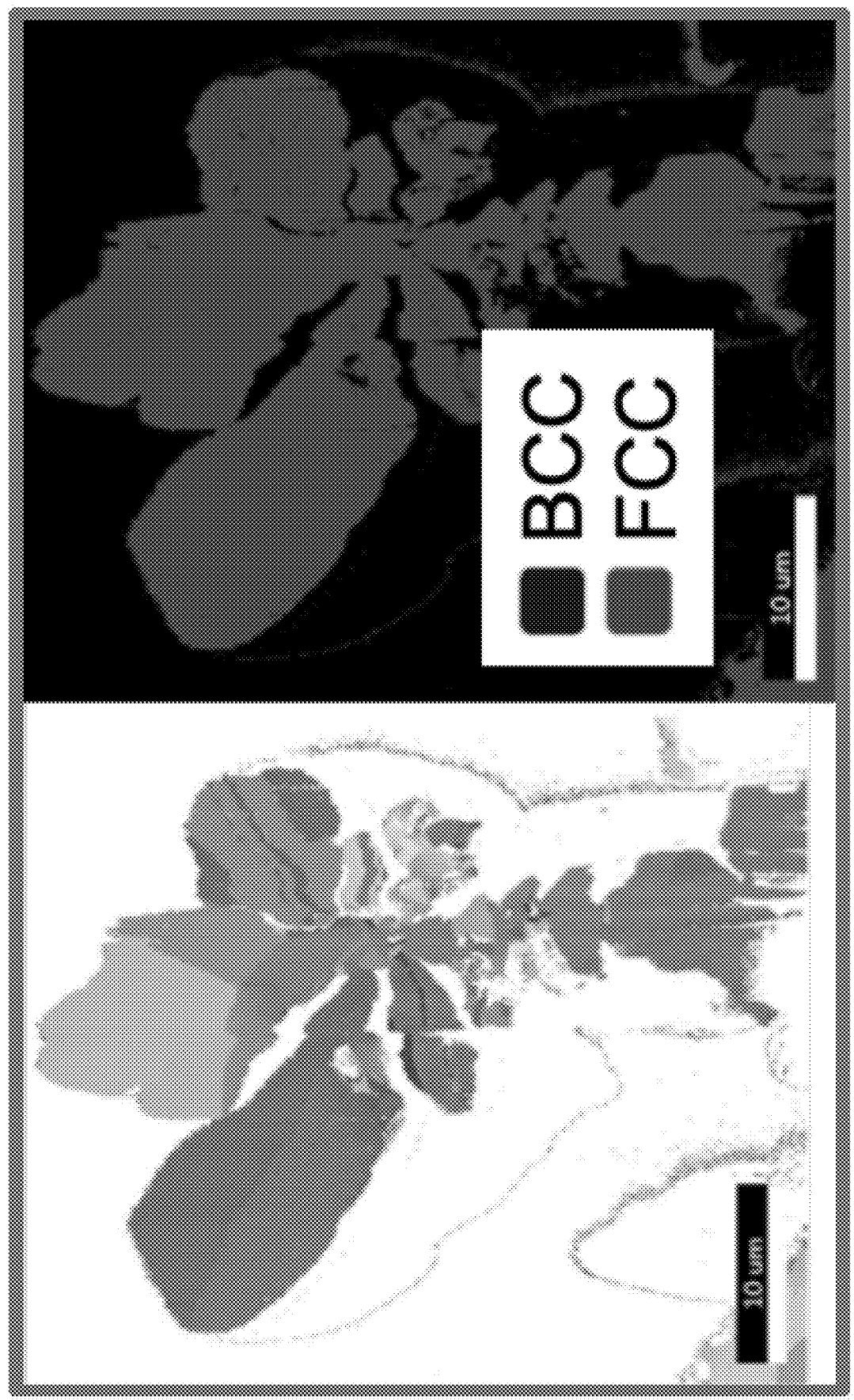
FIG. 16 is an EBSD analysis of an inverse pole figure (left) and a phase image (right)

Subtask 2.4 Characterization Studies:

This subtask correlated the electrical behavior to the output surface morphology, composition, and evaluate the material properties of the deposit. Surface morphology: A SCIOS Dual-Beam Scanning Electron Microscope/Focused Ion Beam (SEM/FIB), available at the university, will be applied to characterize the geometry and the microstructures (grain size, grain distribution, defects, pores) in the output part. In addition, the spatial accuracy of the localized deposition will be characterized. Composition: Diffraction techniques such as the Electron Back Scattered Diffraction (EBSD), X-Ray Diffraction (XRD), Energy-dispersive X-ray Spectroscopy (EDX), and Transmission electron microscopy (TEM) will be used to characterize the samples made. When required, focused ion beam (FIB) method will be used for the sample preparation to polish the surface by sputtering with a beam of ions (FIG. 15). A nano-scale surface layer will then be removed from the sample to perform Electron Back Scattered Diffraction (EBSD) and Energy-dispersive Spectroscopy (EDS) to obtain the diffraction pattern to determine the crystal structure, crystal orientation, differentiate phases, and characterize grain boundaries of the sample in that region. For example, the EBSD analysis shown in FIG. 16 reveals that the deposit has a crystalline structure with the formation of twin boundaries. The BCC structure seen is due to edge effect.

Figure 17:
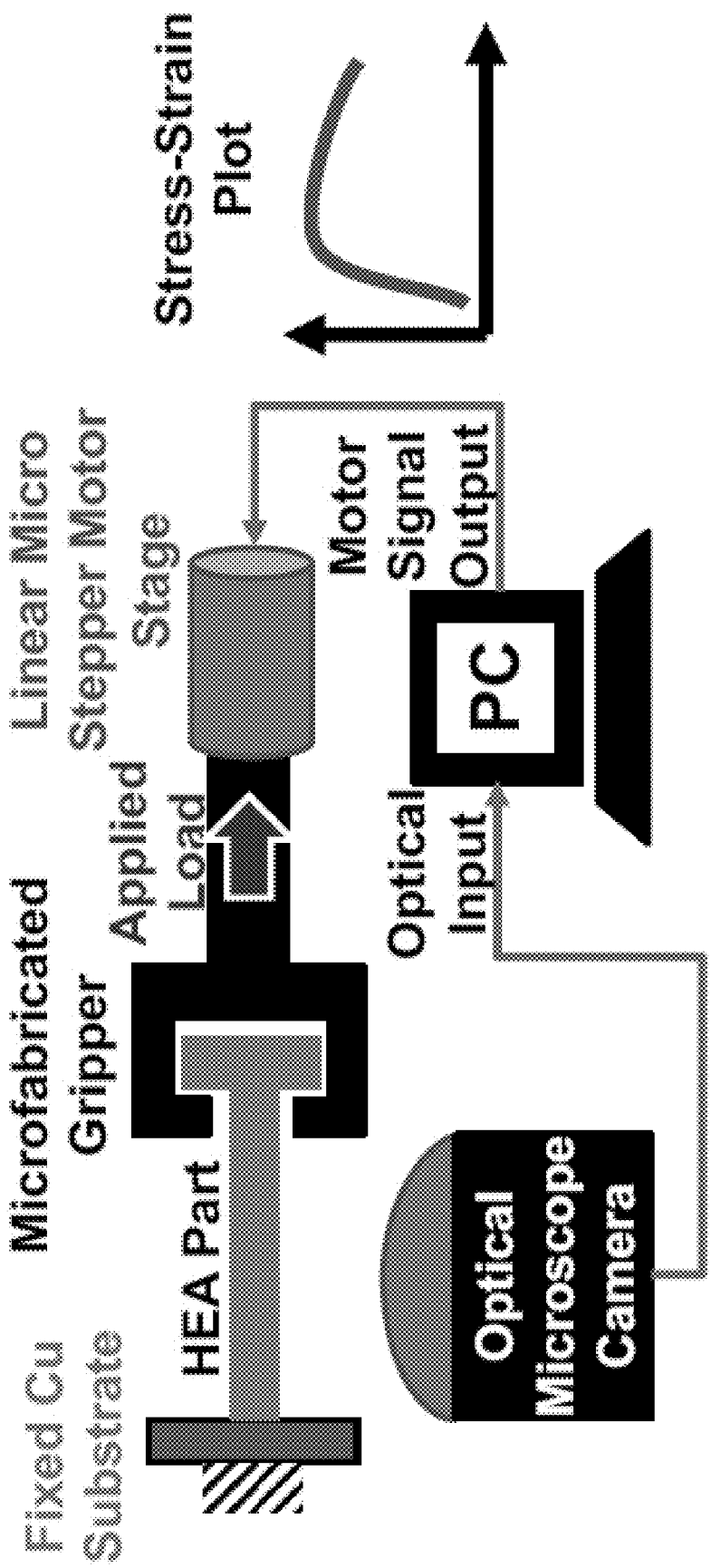
FIG. 17 is a schematic of a tensile testing of a HEA part.

Material properties: Tensile testing of the alloys made will be obtained using a microfabricated gripper shape and optical monitoring. The experimental setup illustrated in FIG. 17 will be used for tensile testing. HEA parts will be fabricated with wider diameter at the tip to enable gripping. The gripper will be connected to a micro-stepper motor stage, will apply the load at a controlled rate. The entire setup will be mounted on an optical microscope for optical-based monitoring of the changing sample as it undergoes the test. The hardness will be measured by the Vickers hardness test and/or nanoindentation method.

Figure 18:
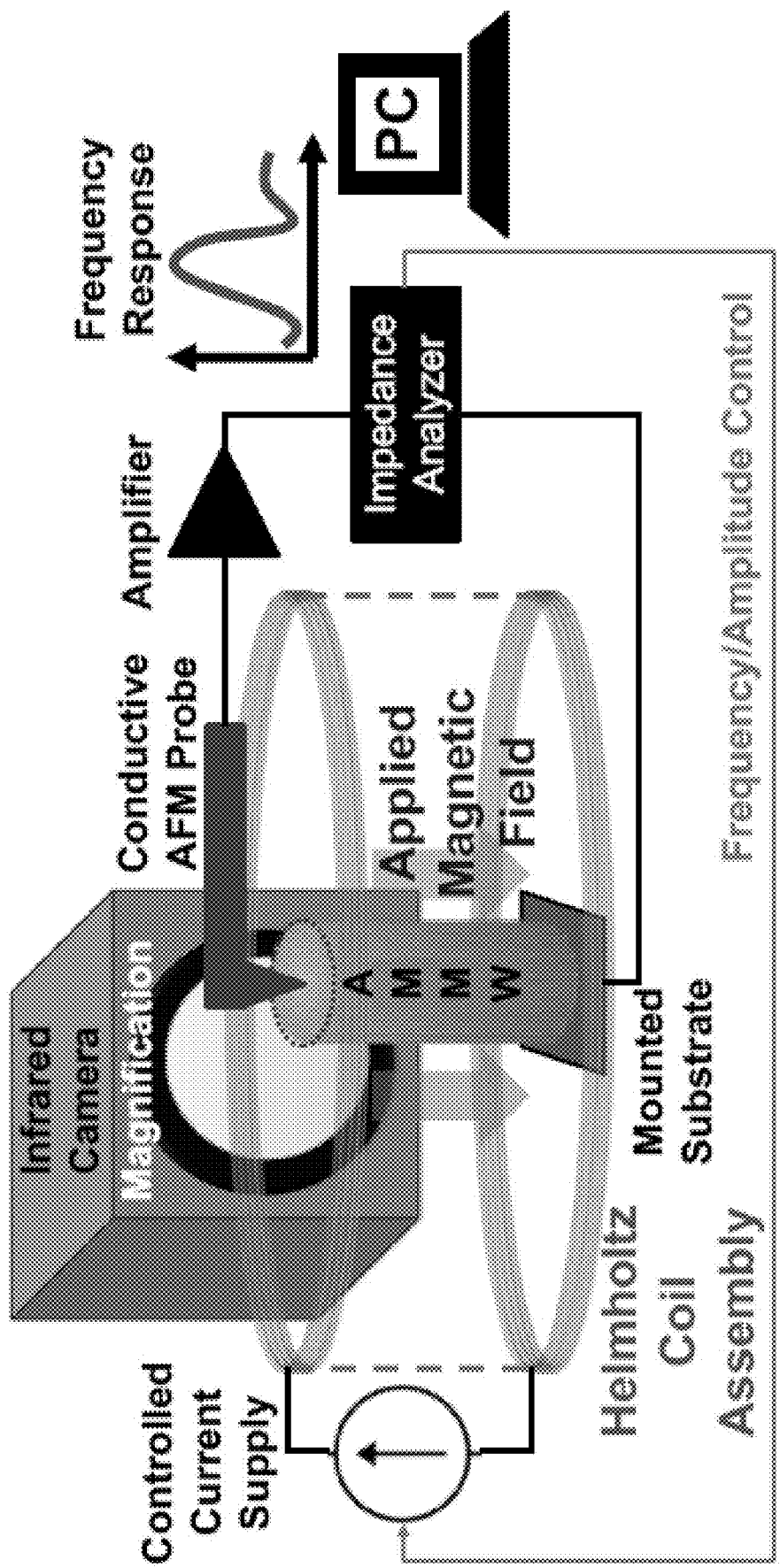
FIG. 18 is a characterization of an amorphous magnetic microwire in an electromagnetic environment.
Figure 19:
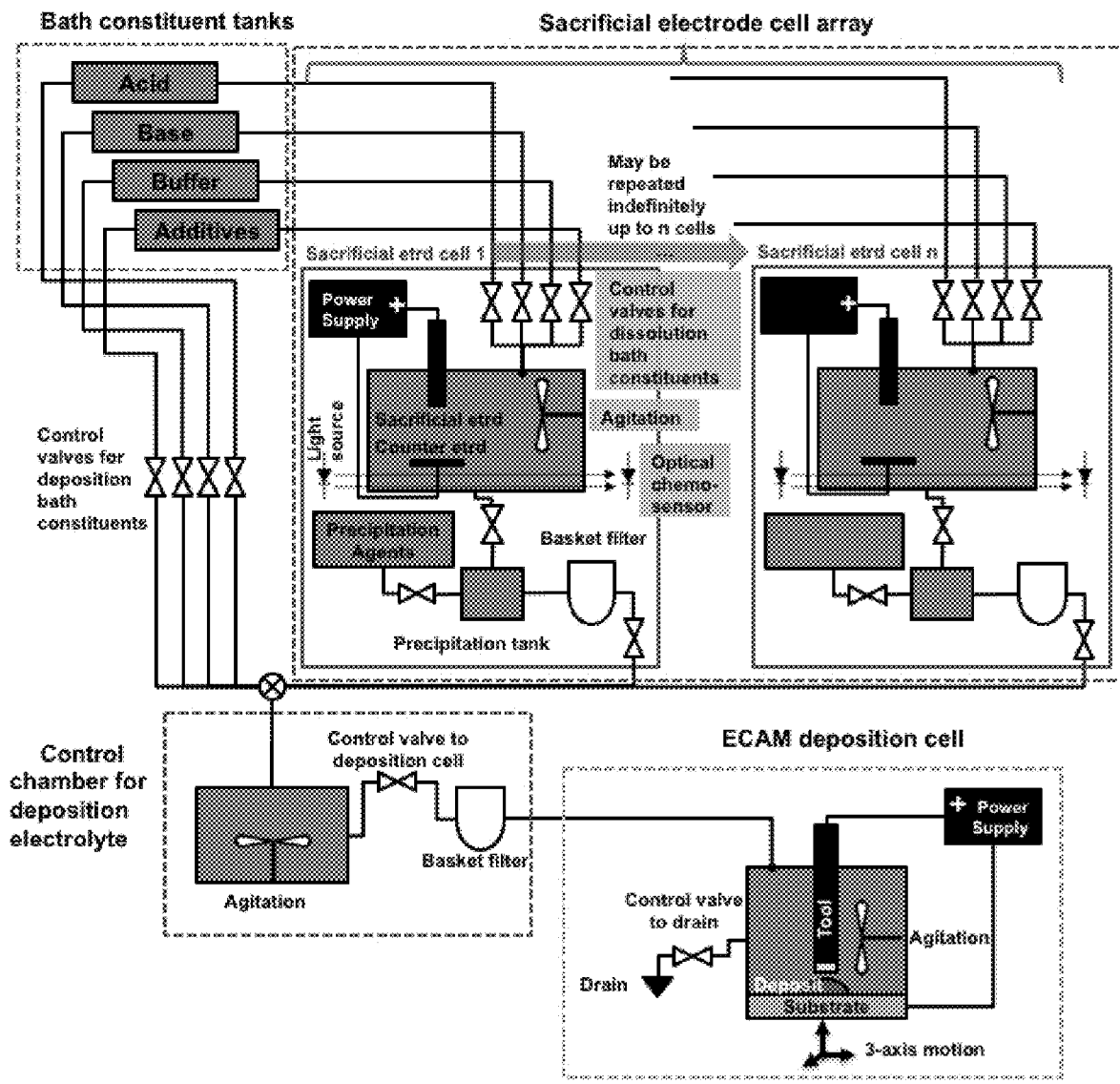
FIG. 19 is a schematic of a system used to carry out a method according to the present invention.

Amorphous Magnetic Microwires: Characterization in an Electromagnetic Environment The experimental setup illustrated in FIG. 18 will be used to characterize the electromagnetic, thermal, and mechanical properties of the amorphous magnetic microwires described in subtask 2.3. The microwire will be subject to a magnetic field generated by a surrounding Helmholtz coil, and the induced current in the wire will be obtained by making electrical contact with both ends. This will be achieved by mounting the part in a Bruker Multimode Ma atomic force microscope (AFM). The Helmholtz coil will be integrated into the AFM. One end of electrical contact will be made with the mounted substrate, and the other end will be made by bringing a conductive AFM probe in contact with the tip of the wire. The induced current under varying frequencies will be fed through amplification (if necessary), recorded into an AD5933 impedance analyzer, and converted into frequency response information to characterize the GMI effect, which will result from the increased functional grading of iron towards the surface. The magnitude of frequency response will be a clue to the power efficiency and conductivity of the microwire, which will result from the functional grading of copper towards the center. Finally, the influence of the functional grading of molybdenum towards the base of wire on the thermal expansion resulting from induced current and Joule heating will be monitored using an infrared camera with a magnifying lens placed near the AFM during application of the magnetic field.

EXAMPLES

Example 1

An in-house-built experimental setup combining microcontrollers (Arduino Mega and Adafruit v2 Motorshields), positioning hardware (three-axis stage of Zaber LSA-10A stepper motors), potentiostat (hand-built), and electrochemical cell (0.25 mm Pt—Ir wire tool and brass plate substrate). The system and voxel-by-voxel closed-loop control deposition method resembled that of prior work with the additional capability of changing deposition conditions in a voxel-by-voxel manner and the use of a multi-metal plating bath (0.5 M $NiSO_4 \cdot 6H_2O$, 0.1 M $CoSO_4 \cdot 7H_2O$, 0.01 M $FeCl_2 \cdot 4H_2O$, 0.05 M $CuSO_4 \cdot 5H_2O$, 0.485 M $H_3BO_3$, 0.5 M $Na_3Cit \cdot 2H_2O$, 0.1 mM $PEG_{3350}$, and 0.18 mM $H_2SO_4$.) The voxel size was define to be 3 motor steps (4.5 μm), and vertical pillars of 300 voxel height (totaling 1350 μm) were constructed using a pulsed square wave of constant or varying voltage and/or frequency. The duty cycle was kept constant at 50%.

A parameter space of low and high tool-substrate voltage differences ($V_{low}$=4.5 V and $V_{high}$=5.5 V) and frequencies ($f_{low}$=100 Hz and $f_{high}$=1000 Hz) was used in this embodiment. Pillars were initially fabricated under constant-voltage, constant-frequency conditions at all combinations—these "baseline" conditions were then incrementally changed to study the additional effect of grading one or both parameters. Baseline low-level parameters were graded up to the high level and vice-versa. Images and atomic percentage quantities of elements deposited were obtained using scanning electron microscopy (SEM), and energy-dispersive X-ray spectroscopy (EDX). A representative image showing a close-up view of the surface and elemental scan of the deposit is shown in FIG. 20.

SEM images of the final pillars are shown in FIG. 20. Pillar widths and copper content percentages at ⅓, ⅔, and full pillar height were manually located and resulting values are inset within the figures. The major quadrants (I-IV) correspond to a given base-line frequency and voltage condition. Within each quadrant, varying grading patterns are shown: (a) both parameters ungraded, (b) frequency graded, (c) voltage graded, and (d) both parameters graded. Any changes in copper content are implicitly accompanied by an opposing change in total magnetic element (NiCoFe) content. Statistical analysis was performed to understand main and interaction effects on elemental content of the pillars.

Table 5 analyzes the average width and copper content of pillars at all constant baseline signals (runs denoted by subscript a). Width and copper content were both higher when comparing $V_{high}$ versus $V_{low}$ (218 vs 101 μm and 56 vs 53% Cu), but less significantly impacted when comparing $f_{high}$ versus $f_{low}$ (223 vs 157 μm and 55 vs 55% Cu). Interactions could not be compared at $V_{low}$ due to consistent breakage of pillars built under its combination with $f_{high}$ (Quadrant II). Trial Ib (4.5 V, graded 100-1000 Hz) includes a pillar approaching these conditions in its upper half, which broke off. This suggests that pillars built using $V_{low}$ and $f_{high}$ at the pillar base failed early in the build failed due to a fragile geometry under the bubbling electrolyte beneath the tool. Although higher frequencies would be expected to deposit more copper, there was no systematic main effect of frequency on copper content. Overall, the observed behavior elucidates (1) a voltage-dependent frequency response and (2) limited deposit ion capabilities at specific voltage-frequency combinations.

TABLE 5

Main and interaction effects of baseline signals on average output width (first value in μm) and Cu content (second value in atomic %) in pillars; annotations in the table correspond to trials that were averaged.

| Parameter | $f_{low}$ | $f_{high}$ | Main eff. | Int. eff. |
|---|---|---|---|---|
| Vlow | 101/53 (Ia) | N/A/N/A(IIa) | 101/53 | N/A/N/A |
| Vhigh | 213/57 (IIIa) | 223/55 (IVa) | 218/56 | 10/2 |
| Main eff. | 157/55 | 223/55 | | |
| Int. eff. | 112/4 | N/A/N/A | | |

The higher average copper content seen at a higher voltage appears opposite to what is expected from the electrochemical series. This deviation may be explained by copper ion complexation with citrate, which minimizes its reduction potential relative to iron-group metals. Deviation of a similar nature emerged in ECAM of NiCu pillars using a citrate bath. Additionally, the active plating area is not discretely confine to the tool-substrate gap. Instead, it tapers off gradually, exposing the entire substrate and built voxels to relatively low current densities that influence plating geometry. In CG-ECAM, these conditions would cause higher copper content to accumulate on earlier voxels. A higher tool-substrate voltage difference also raised the overall magnitude of the auxiliary low current densities, likely depositing even more copper. This is reflected in the increase in copper content at the bottom pillar location from 69% to 78% when the baseline voltage was increased from 4.5 to 5.5 V respectively at 100 Hz operation.

Figures 21A, 21B:
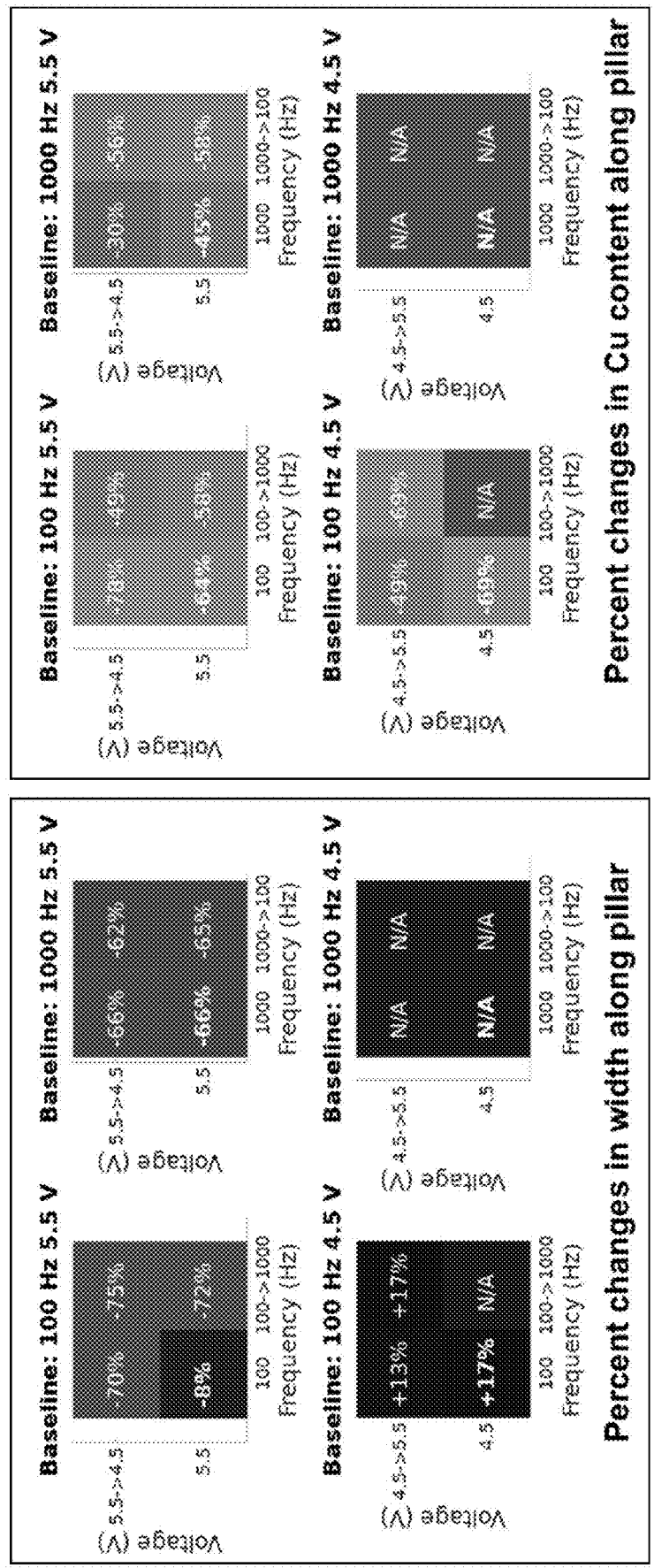
FIGS. 21A and 21B are tables showing percent changes from the bottom to the top of pillars.

Next, the feasibility of grading the outputs was evaluated, starting from different initial conditions at the base of the pillars. Percent changes in outputs along pillar length are shown in FIGS. 21A and 21B. The information shown in FIGS. 21A and 21B represent a first study of compositional grading. Table 6 provides main effects and interactions of varying combinations of applied grading patterns (down, ungraded, or up). Graded changes in output occurred even when both voltage and frequency were ungraded. This behavior suggests that each voxel built was also sensitive to the dynamic electrochemical environment and characteristics of previously-deposited voxels.

TABLE 6

Main and interaction effects of signal grading patterns on graded percent change in output width (firs value) and Cu content (second value) along pillar length; annotations in the table correspond to trials that were averaged.

| Parameter | f↓ | $f_{ungraded}$ | f↑ | Main eff. | Int. eff. |
|---|---|---|---|---|---|
| V↓ | −62/−56 (IVd) | −68/−54 (IIIc, IVc) | −75/−49 (IId) | −68/−53 | 6/24 |
| $V_{ungraded}$ | −65/−58 (IVb) | −14/−44 (Ia, IIa, IIIa, IVa) | −72/−58 (IIIb) | −32/−49 | 55/22 |
| V↑ | N/A/N/A (N/A) | +7/−25 (Ic, IIc) | +17/−69 (Id) | +10/−39 | 11/45 |
| Main eff | −63/−57 | −22/−42 | −43/−59 | | |
| Int. eff. | 2/3 | 40/32 | 46/10 | | |

Reflecting the trend seen in baseline conditions, changing the voltage grading pattern (from down, to ungraded, to up) resulted in a systematic increase in width (−68% to −32% to +10%) and stifle decrease in copper content (−53% to −49% to −39%) along pillar length. A similar change of frequency grading did not yield systematic changes in narrowing (−63% to −22% to −43%) or decrease in copper content (−57% to −42% to −59%) along pillar length. Width was most sensitive to frequency effects at an ungraded voltage. Copper content was most sensitive to frequency effects at a high voltage. Width was most sensitive to voltage interactions when frequency was graded up. Copper content was most sensitive to voltage when frequency was ungraded. Overall, width and elemental composition varied systematically with voltage, but frequency effects were more complex.

Extension of ECAM to a process capable of fabricating compositionally-graded micro pillars was demonstrated by controlling the applied plating signal parameters (voltage and frequency) in a voxel-by-voxel manner and analyzing the effect on the graded pillar width and elemental composition. Starting with a higher baseline voltage yielded slightly higher copper content. This ran counter to what would be expected from the electrochemical series, but was explained by the influence of citrate complexation and auxiliary plating effects. A higher baseline frequency yielded no noticeable main effect on copper content. Although higher copper content was expected at higher frequencies, results instead showed an irregular trend and suggest a complex frequency response of the system.

The degree of width and compositional grading along the micro pillars was quantified by calculating their respective percent changes from the bottom to the top of the pillar. Under a steady baseline signal, these outputs already varied along the length of the pillar. Grading voltage up increased the resulting grading up of pillar width and copper content. An overall increase in copper content along the length of the pillar was also seen—this was likely due to auxiliary plating effects skewing voxels earlier in the build to accumulate more copper during the build of subsequent voxels. This effect could be compensated for via a pre-programmed voltage pattern or more precise potentiostatic control of the substrate. Applied frequency changes did not result in a unified trend across all trials, suggesting that this parameter should be secondary to and fine-tuned with respect to the applied voltage.

Example 2

The feasibility of increasing the material repertoire and compositional control in the electrochemical additive manufacturing (ECAM) process was demonstrated in by introducing a combined dissolution-deposition system that could dissolve and deposit the constituent metals of a NiCoFeCuMo high entropy alloy. A balanced set of supporting bath compositions was determined such that the constituent metals could undergo separate dissolution and be mixed together in a final deposition bath that would function for localized deposition. The influences of varying acid, anion, and cation concentrations on deposit atomic composition and width were studied. It was found that lower acid and higher citrate concentrations yielded larger deposits with materials suitable for use in hard magnetic parts, while higher acid or lower cobalt concentrations yielded narrower deposits with materials suitable for use in soft magnetic or conductive parts. Molybdenum appeared in all deposits at a quantity within 5% and its composition in the deposit was not significantly influenced by adjustment of aqueous electrolyte species concentrations, even its own. This served to demonstrate the feasibility of depositing five-metal high entropy alloy parts using dynamic solution control via dissolving sacrificial electrodes.

The feasibility of ECAM to deposit 5-element high-entropy alloy parts, with compositional control enhanced by the use of solutions of varying compositions generated by sacrificial metal anodes was examined. A high-entropy alloy was used as the material system.

Several codeposition relationships exist among the metals in NiCoFeCuMo system, summarized in FIG. 20. Anomalous codeposition occurs among the iron-group metals Ni, Co, and Fe, in which the less noble metals in the electrochemical series deposit preferentially. A regular codeposition relationship occurs between Cu and iron-group metals, where the more-noble copper deposits preferentially. However, outside of limiting current ranges, the iron-group metals can inhibit the deposition of copper. Induced codeposition occurs between Mo (an element unable to deposit on its own in most conditions) and any iron-group metal Ni, Co, or Fe. Mo deposition is most strongly induced by Co, followed by Ni and Fe; however, increasing Fe concentration has been found to inhibit Mo deposition. Cu does not readily induce deposition of Mo.

Figure 22:
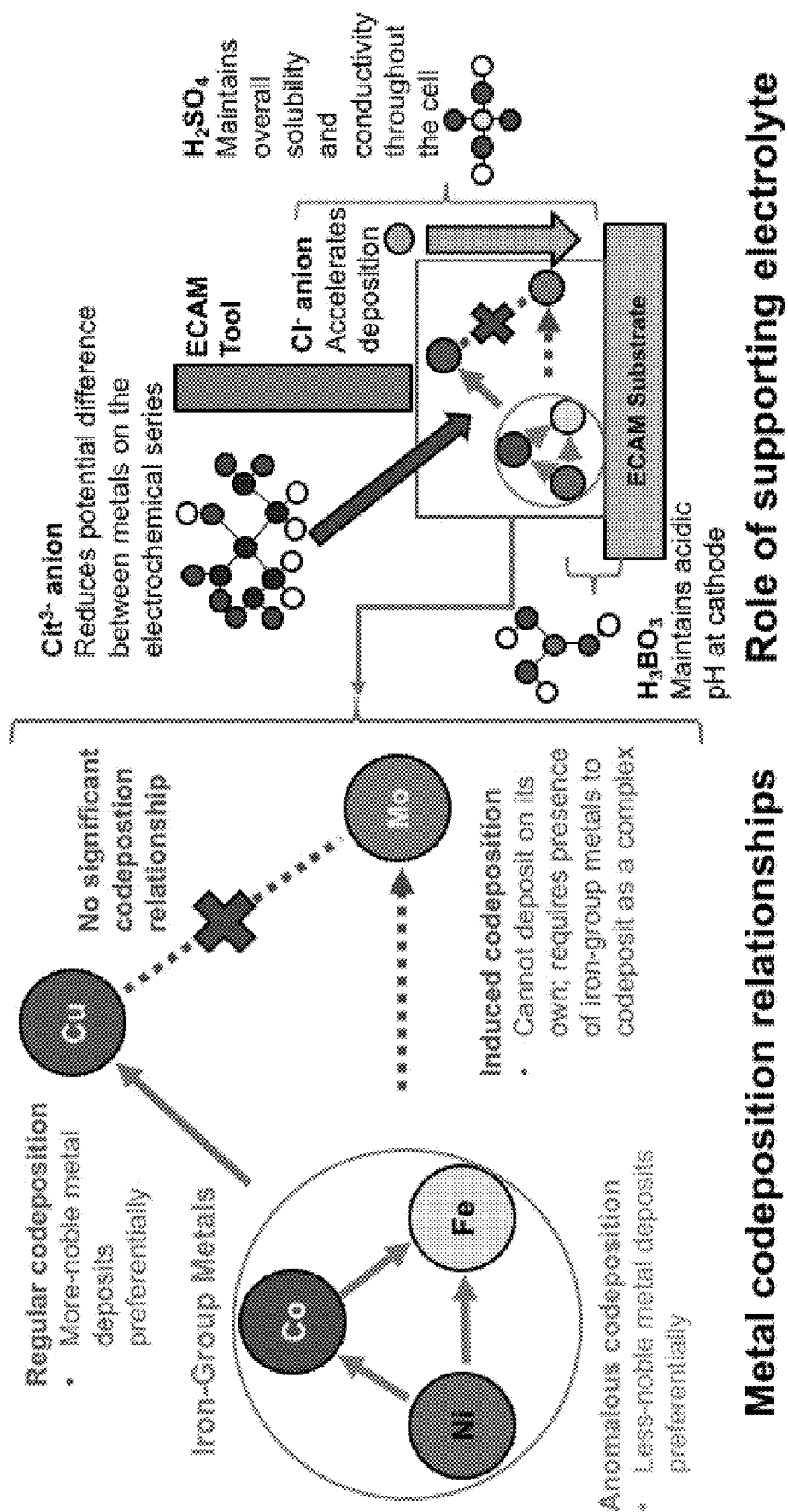
FIG. 22 is an illustration of metal codeposition relationships in a CiCoFeCuMo system, the arrows point in the direction of one species enhancing or enabling the deposition of another species.

The supporting electrolyte species are beneficial for achieving both dissolution and deposition. Prior work in deposition of the constituent metals was surveyed. Representative examples include: a ternary iron-group system containing Ni, Co, and Fe; two iron-group metals Ni and Co in the presence of noble Cu; and the iron-group Ni depositing with noble Cu and induced codeposition of Mo. The baths shared common acids and additives. Concentrations of metals and common supporting species are listed in Table 7. It was found that the most common and essential supporting species consisted of acid $H_2SO_4$, buffer $H_3BO_3$, accelerating additive NaCl, and complexing additive $Na_3Cit$, as subsequently analyzed. The supporting electrolyte roles are summarized in FIG. 22. Further acids or additives were not considered in this study.

TABLE 7

Representative examples of alloy systems making use of deposition relationships

| Ni | Co | Fe | Cu | Mo | pH | $H_2SO_4$ | $H_3BO_3$ | NaCl | $Na_3Cit$ |
|---|---|---|---|---|---|---|---|---|---|
| 0.2 | 0.1 | 0.04 | N/A | N/A | 2.8-3.5 | N.S. | 0.4 | N/A | N/A |
| 0.380 | 0.014 | N/A | 0.002 | N/A | 3.7 | N.S. | 0.485 | 0.103 | 0.068 |
| 0.75 | N/A | N/A | 0.06 | 0.02 | 7 | N/A | N/A | N/A | 0.45 |

The pH of the electrolyte, influenced by acid concentration, significantly determines the overall performance of the plating cell. Control of pH to a resolution of 0.1 is sufficient to maintain consistent plating conditions. In alloy plating, pH may influence the chemical nature of ions in solution and vary the output alloy composition. This effect becomes more pronounced with increased ion complexation. In contrast to other anions, sulfate is chemically inert at the anode and cathode and its concentration does not affect the voltage-current response during plating; therefore, H2SO4-based baths were used to establish an overall acidic pH in the ECAM process without introducing any other influence.

Deposition of iron group metals is accompanied by hydrogen evolution—due to their reduction potentials being lower than that of hydrogen evolution—and a rise in pH near the cathode. Passive anode and different anode vs cathode surface areas (conditions in the ECAM cell) also cause an increase in pH—this is applicable to the highly-localized ECAM cell with an noble electrode. Local pH increases result in the precipitation of metal hydroxides and their occlusion in the deposit. Although acids control the overall bath pH, the local pH near the interface is still prone to rise, requiring additional buffering agents to maintain a stable pH, such as boric acid.

Chloride anions at values near 1 M were found to catalyze the deposition of iron-group metals Ni, Co, and Fe; resulting in an increased current efficiency. Chloride anions also catalyze copper deposition, but only in the form of an adsorbed chloride layer on the substrate at mM-level chloride concentrations. At higher (near 1 M) concentrations, bulk copper chloride complexation occurs and decreases the availability of free copper ions that can deposit and also the possibility of solid CuCl precipitation. Addition of chloride in the deposition of a CoMo alloy was found to lower voltage requirements to deposit the same ratio of Mo, but caused a reduction in deposition quality due to competitive chloride surface adsorption.

The citrate anion complexes with metal ions in the bath and serves several functions, including: maintenance of electrolyte stability (avoidance of precipitation) in baths containing iron-group and molybdenum ions, increase in deposit density and quality of iron-group-metal-containing alloys, minimization of large reduction potential differences between metal pairs (i.e. Ni and Cu), and formation of complexes to enable induced Mo codeposition with iron-group metals.

Figure 23:
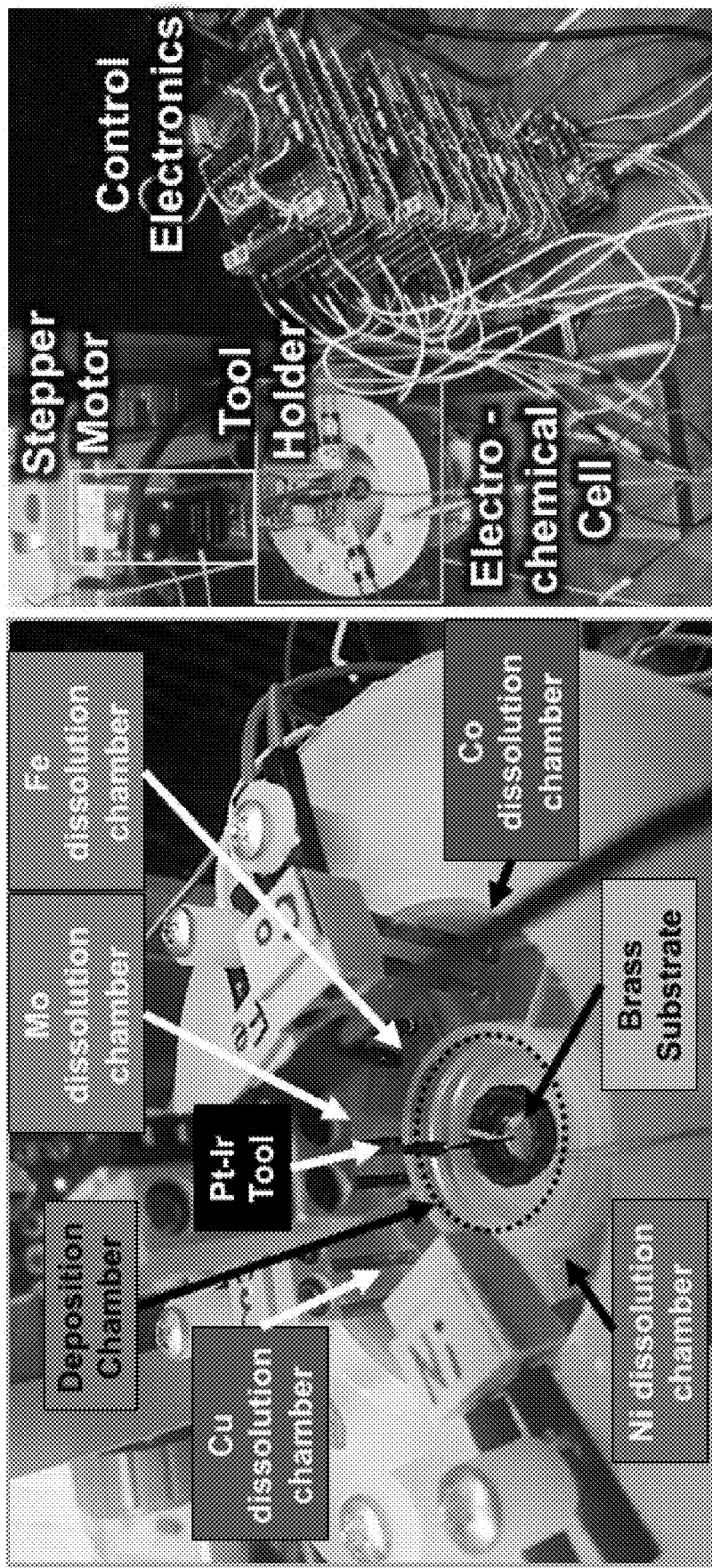
FIGS. 23A and 23B are photographs of an electrochemical cell to control an ECAM setup.

The method included of three main operations—dissolution of each constituent solid metal into the aqueous state in distinct baths, mixing of the baths, and using the combined bath to deposit an ECAM pillar. A multi-chamber electrochemical cell, shown in FIG. 23, was used to house dissolution and deposition operations. The outer chambers were used for dissolution of the individual metals. The central chamber was used for ECAM pillar deposition; deposition also involved positioning the tool relative to the substrate using a Zaber LSA-10A micro stepper motor controlled by an Adafruit v2 Motorshield. All electrode and motor control tasks were driven by an Arduino Mega 2560 board and custom control code. Dissolution and deposition functions were controlled using custom circuit. Each constituent metal Ni, Co, Fe, Cu, and Mo was dissolved in an independent chamber consisting of two metal rod electrodes of the corresponding metal immersed in "blank" electrolyte. One electrode served as the anode and the other served as the cathode. Deposition was conducted in the central chamber, making use of the tool as anode and substrate as cathode, immersed in the mixed electrolyte. FIG. 23 gives an overall view of the setup.

Figure 24:
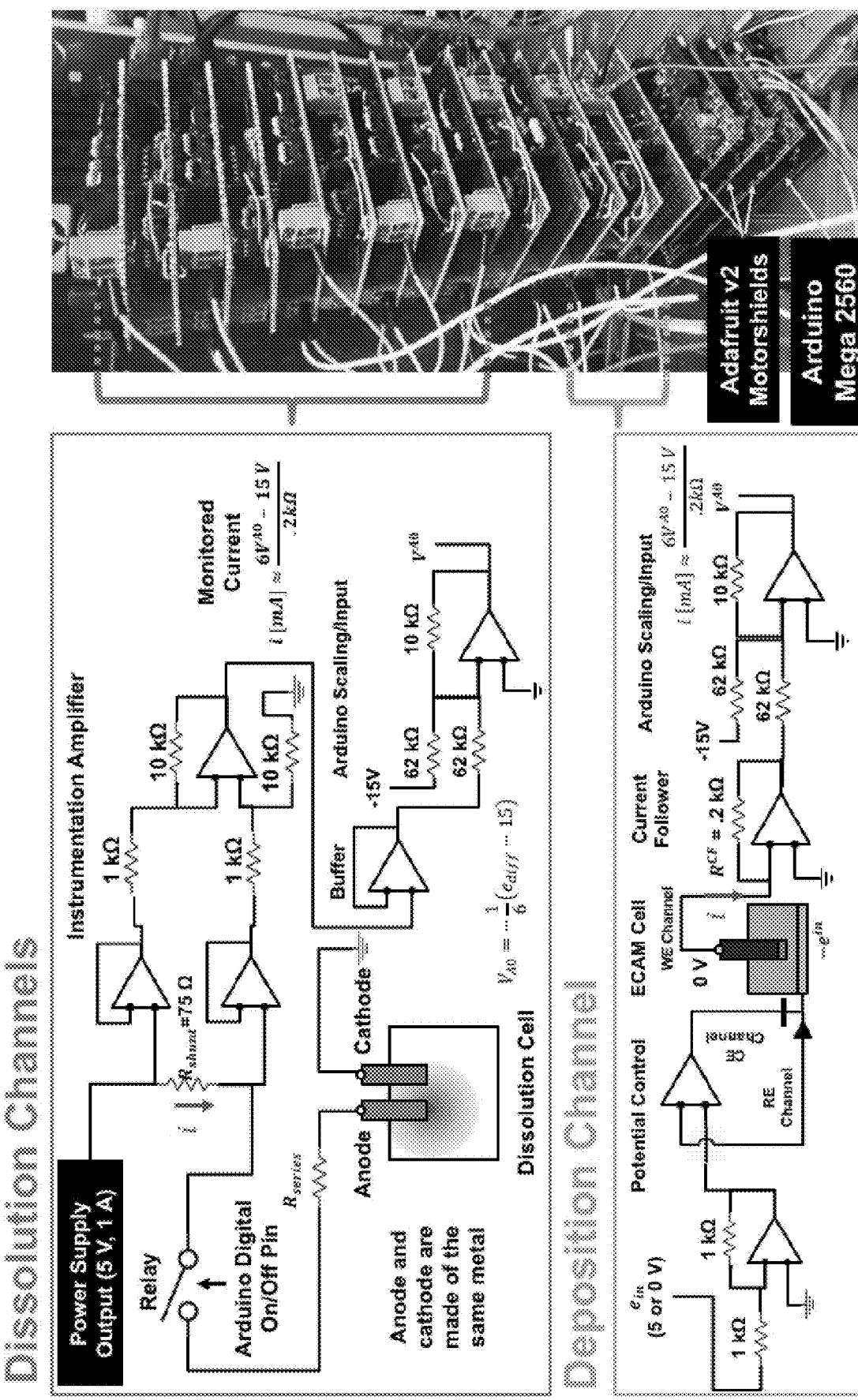
FIG. 24 is a schematic and photograph of control electronics including a dissolution chamber and a deposition chamber.

Electrochemical control circuits are outlined in FIG. 24. The dissolution of all sacrificial electrodes was powered by a common 5V/1 A supply. Each sacrificial electrode was independently controlled by a separate channel, containing a relay and current monitoring circuit. When a given sacrificial electrode was active, its relay was set to the closed position, connecting it to the common power supply. When dissolution was complete, the electrode pair was deactivated by opening the relay. To avoid saturating the current-reading circuitry, relatively low resistors $R_{series}$ were added in the dissolution circuits. Initially, 68Ω resistors were used; exceptions were made for the Co electrode, which required a 300Ω resistor, and the Cu electrode, where the resistance was decreased to 51Ω. The deposition of the ECAM pillar was controlled by a single potentiostat channel wired in a 2-electrode configuration. The potentiostat was capable of applying a tool-substrate voltage difference $e_{in}$ and monitoring the current entering the tool.

An initial attempt was made to dissolve all five metals in the same supporting electrolyte composition that would be used for plating, denoted the "common blank" electrolyte. Out of the representative examples in Table 7, the entry having 0.380 Ni, 0.014 Co, etc. demonstrates use of all four electrolyte components discussed in the literature review and a similar composition was used to enable versatility in plating all five metals. An $H_2SO_4$ concentration was not explicitly specified, so a concentration of 0.00018 M was calculated to yield the specified pH of approximately 3.7 (accounting for the additional presence of $H_3BO_3$). Two exceptions were made: (1) the dissolution bath for copper omitted NaCl due to known chloride precipitate formation during anodic dissolution of Cu in the presence of Cl– ions; (2) subsequent experiments showed Ni could not successfully dissolve in the common blank, so an adjusted bath was formulated for Ni dissolution. Dissolution bath compositions are listed in the first three rows of Table 8 and linked to each metal in Table 9. To study the effect of supporting electrolyte on deposition, additional mix-in blank baths were formulated with elevated concentrations of one species at a time, listed in the last three rows of Table 8, and their exact usage is detailed further herein.

TABLE 8

Summary of blank baths

| Bath | Uses | $H_3BO_3$ (M) | $H_2SO_4$ (M) | NaCl | Na$_3$Cit |
|---|---|---|---|---|---|
| Common blank | Co/Fe/Mo dissolution Baseline for deposition Mix-in for deposition | .485M | .00018M | 0.1M | 0.07M |
| Common blank (no NaCl) | Cu dissolution | .485M | .00018M | 0M | 0.07M |
| Nickel dissolution blank | Ni dissolution | .485M | 1M | 1M | 0M |
| High acid addition blank | Mix-in for deposition | .485M | 1M | 0.1M | 0.07M |
| High citrate addition blank | Mix-in for deposition | .485M | .00018M | 0.1M | 1M |
| High NaCl addition blank | Mix-in for deposition | .485M | .00018M | 1M | 0.07M |

The representative examples listed in Table 7 were also used as a starting point for the relative quantities of dissolved metal cations. Target concentrations of metal ions to dissolve were selected to roughly follow the orders seen across multiple papers and listed in Table 9.

TABLE 9

Parameters associated with dissolution of each individual metal

| Metal | z (Valence) | Dissolution bath | Target metal concentration in dissolution volume | Volume | Rseries |
|---|---|---|---|---|---|
| Ni | +2 | Nickel dissolution | 0.4M | 1 mL | 68 |
| Co | +2 | Common blank | 0.1M | 1 mL | 300 |
| Fe | +3 | Common blank | 0.02M | 1 mL | 68 |
| Cu | +2 | Common blank (no NaCl) | 0.02M | 0.5 mL | 51 |
| Mo | +6 | Common blank | 0.02M or 0.05M | 0.5 mL | 68 |

All metals started at zero dissolved concentration and in the active dissolution state. Dissolution of each metal was then controlled in a closed-loop manner using the custom circuitry. Instantaneous current was monitored at regular intervals of approximately one second and used to calculate the accumulated concentration. Each individual sequence of delay, current reading, and concentration calculation was named as a "timestep" for brevity.

For each sacrificial electrode of species j, the instantaneous current $i_j(t)$ was used to update the approximated dissolved metal concentration $c_j(t)$. Integration of current to obtain the total passed charge $q_j$ over time interval $t_0$ to $t_f$ was approximated by multiplying each current reading by the sampling interval $\Delta t$, and then accumulating the sum of $i_j(t)\Delta t$ over all discrete timesteps, as shown in Equation 1. To obtain concentration $c_j$, the dissolved moles $n_j(t)$ in volume $V_j$ were required. At each timestep, the moles were calculated as $$n_j(t) = \frac{q_j(t)}{z_j F};$$

making use of Faraday's law, the valence $z_j$ of each species, and Faraday's constant F=96485 C/mol. The concentration calculated at each timestep is shown in Equation 2. It is also noted that this approach treats the dissolution process with an implicit 100% current efficiency, meaning the full current is contributing to the dissolution reaction. However, this may be influenced by competing reactions. Therefore, the concentration calculation is approximate.

$$q_j(t) \approx \int_{t_0}^{t_f} i_j(t)dt \approx \sum_{t_0}^{t_f} i_j(t)\Delta t \qquad \text{Equation 1}$$

$$c_j(t) \approx \frac{n_j(t)}{V_j} \approx \frac{q_j(t)}{z_j F V_j} \qquad \text{Equation 2}$$

When the concentration of any given metal within each chamber reached the target value, the control system opened the corresponding relay to deactivate the dissolution process. The electrodes were promptly manually removed from the cell to avoid unwanted, spontaneous open-circuit reactions. The electrolyte and electrode surfaces were visually inspected for any potential obstacles to successful dissolution and later deposition, such as passivation or formation of insoluble precipitates. Baths in which dissolution completed successfully were saved for subsequent mixing and deposition tasks. Unsuccessful dissolution for any given metal prompted a targeted literature review and adjustment on an as-needed basis.

After all dissolution operations were completed, the baths were mixed together to create the final plating bath. The Ni, Co, Fe, Cu, and Mo component baths made up 20%, 20%, 20%, 10%, and 10% of the total mixed bath. A final 20% of the bath included a blank solution component mixed in to study the effect of supporting electrolyte components on deposition. The initial tested bath 1 consisted of the metal ion dissolution baths at previously-specified concentrations with a common blank bath mix-in. The concentration of $H_2SO_4$ was then varied in baths 2 and 3. Elevated anion concentrations were then studied—Na3Cit in bath 4, and NaCl in bath 5. Finally, altered cation concentrations were explored—a lower cobalt concentration in bath 6, and an increased molybdenum concentration in bath 7. The cobalt concentration was lowered by replacing half of the default volume of cobalt with common blank solution. The molybdenum concentration was increased by replacing the default 0.02 M solution with 0.05 M specially dissolved for this trial. An overview of the final bath formulations is provided in Table 10.

It was also noted that irregularities may occur across dissolution trials due to qualitatively observed variations in electrode surface area and electrode placement, and inferred competing reactions. The infrastructure to precisely monitor and compensate for such behaviors was outside of the scope of this work. It was therefore assumed that the concentrations were approximately in the order of the listed values, rather than precisely equal to them. To avoid the metal ion concentrations varying from one deposition bath to another as an artifact of precise dissolution behavior from one dissolution run to another, the individual component metal baths from five separate dissolution trials were first accumulated together, and then used as common sources to formulate all final deposition baths.

TABLE 10

Summary of bath mixing parameters

| (a) Volume Ratios | | Components of mixed bath | | | | |
|---|---|---|---|---|---|---|
| Bath component | Blank mix-in | Ni bath | Co bath | Fe bath | Cu bath | Mo bath |
| Volume percentage | 20% | 20% | 20% | 20% | 10% | 10% |

| (b) Resultant bath compositions | | Resultant metal ion concentrations in mixed bath | | | | |
|---|---|---|---|---|---|---|
| Bath description | Blank bath choice | Ni ions | Co ions | Fe ions | Cu ions | Mo ions |
| (1) Baseline | Common blank (full) | 0.08M | 0.02M | 0.004M | 0.002M | 0.002M |
| (2) Medium $H_2SO_4$ | Common blank (½) High $H_2SO_4$ (½) | 0.08M | 0.02M | 0.004M | 0.002M | 0.002M |

TABLE 10-continued

Summary of bath mixing parameters

| | | | | | | |
|---|---|---|---|---|---|---|
| (3) High $H_2SO_4$ | High $H_2SO_4$ (full) | 0.08M | 0.02M | 0.004M | 0.002M | 0.002M |
| (4) High $Na_3Cit$ in Medium $H_2SO_4$ | High $Na_3Cit$ (½) High $H_2SO_4$ (½) | 0.08M | 0.02M | 0.004M | 0.002M | 0.002M |
| (5) High NaCl in Medium $H_2SO_4$ | High NaCl (½) High $H_2SO_4$ (½) | 0.08M | 0.02M | 0.004M | 0.002M | 0.002M |
| Low Co in Medium $H_2SO_4$ | Common blank (½) High $H_2SO_4$ (½) | 0.08M | 0.01M | 0.004M | 0.002M | 0.002M |
| High Mo in Medium $H_2SO_4$ | Common blank (½) High $H_2SO_4$ (½) | 0.08M | 0.02M | 0.004M | 0.002M | 0.05M |

After the mixed baths were prepared, they were used as the deposition baths for the ECAM process in the central chamber of the multi-chamber cell. Localized electrochemical deposition was performed between a 0.250 mm Pt—Ir tool and a brass plate substrate in a closed-loop voxel-by-voxel manner as established in prior work. Voltage application and current monitoring was performed by a single potentiostat channel wired in a 2-electrode configuration shown in FIG. 24, with the tool connected to a working electrode current follower and the substrate connected to shorted reference and counter electrode channels. The applied tool-substrate voltage was 5 V.

An initial attempt was made to dissolve all five elements in the common blank solution (with NaCl omission for Cu) intended to be used for plating. The initial state of dissolution and progress after 5 minutes is shown in FIG. 25. All metals reached their target concentrations without concern, except for Ni: a significant amount of insoluble precipitate with a light green foamy appearance formed. This compound was assumed to be $Ni(OH)_2$. The run was cancelled at this stage, and a top-down view of the dissolution cell was captured, as seen in FIG. 25. This prompted a further review and refinement of the Ni dissolution electrolyte, detailed in the upcoming section. Precipitation was observed for Mo; an additional literature review was conducted and this was found to be not problematic.

Literature was surveyed to determine a suitable electrolyte to perform Ni dissolution, with the intention of only using a subset of species found in the common blank bath. Several examples making use of sulfuric acid and/or Cl− ion sources were found and are listed in Table 11.

TABLE 11

Literature review of baths for anodic dissolution of nickel

| $H_2SO_4$ | Cl− |
|---|---|
| 0.005M | 0 to 0.1M KCl |
| 1M | 0.003, 0.01, 0.02, 0.04, 0.06M HCl |
| 1M | 0.004, 0.008, 0.01M NaCl (approx.) |
| 1M | 0.1M NaCl |
| 0M | 0.05 to 1M HCl |

Of the examples in this survey, a 1 M concentration of $H_2SO_4$ and concentration of Cl− within the 0.1 M range was predominantly reported. However, to avoid abrupt changes in the final deposition bath, the lowest concentration of $H_2SO_4$ was initially attempted, serving as an incremental increase from the common blank bath concentration. Coincidentally, such a concentration of $H_2SO_4$ yields a pH of approximately 3 if the Ni bath composes ⅕th of the final plating bath, near the pH of 2.8 used in prior deposition of iron-group alloys mentioned in the survey of plating baths in Table 7. The concentration of 0.1 M Cl− ions accompanied this $H_2SO_4$ concentration and appeared to be a moderate value suitable for preventing known passivation behavior, so it was also used in the initial dissolution attempt. Citrate was omitted to minimize complications due to its role in ion complexation in deposition baths. Boric acid was also not traditionally seen in dissolution baths, but it was preserved in the Ni dissolution bath due to its function as an acid and to not alter the concentration of $H_3BO_3$ in the final plating bath, which is essential to prevent metal hydroxide formation at the cathode when plating iron-group metals. This non-traditional use of $H_3BO_3$ in the anodic dissolution was therefore expected to cause deviations from what has been reported in literature. Nickel dissolution was conducted in a trial-and-error manner for five trials (a) through (e), as documented in Table 12 and shown in FIGS. 26A, 26B, and 26C.

TABLE 12

Overview of nickel dissolution solution refinement trials

| Trial | Conc $H_3BO_3$ | Conc $H_2SO_4$ | Conc NaCl | Observations/Notes |
|---|---|---|---|---|
| (a) | 0.485M | 0.005M | 0.1M | Insoluble precipitate formation within 15 minutes |
| (b) | 0.485M | 0.05M | 0.1M | Insoluble precipitate formation within 20 minutes |
| (c) | 0.485M | 0.5M | 0.1M | No precipitate, but visibly lighter than trial (d) after visual comparison |
| (d) | 0.485M | 1M | 0.1M | No precipitate, but visibly lighter than trial (e) after visual comparison |
| (e) | 0.485M | 1M | 1M | No precipitate |

Figures 26A, 26B, 26C:
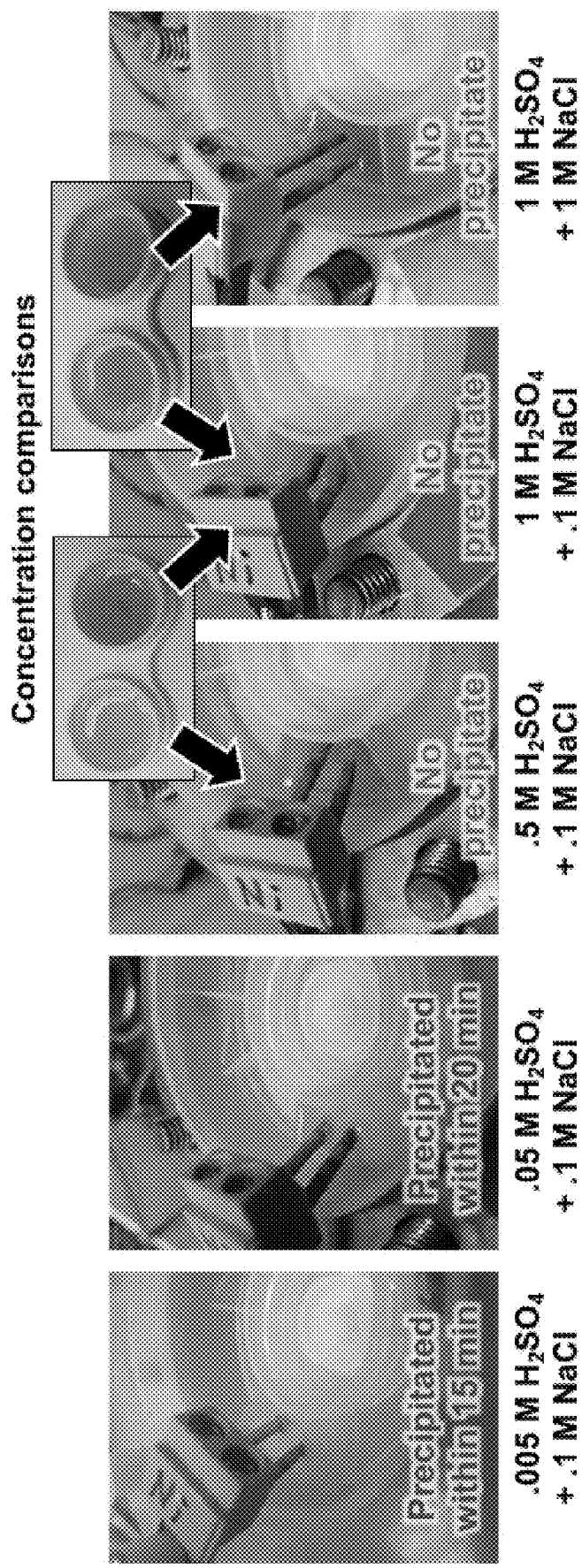
FIGS. 26A, 26B, and 26C are a series of photographs of observations of a nickel dissolution process.

As shown in FIG. 26A, the initial dissolution conditions resulted in precipitation observed within 15 minutes. A tenfold increase in acid concentration was then attempted, but still resulted in precipitation as shown in FIG. 26B. FIG. 26C includes three panels, identified herein as FIG. 26C left panel, FIG. 26C middle panel, and FIG. 26C right panel. A further tenfold increase led to a trial with no precipitate; however, the solution appeared relatively pale, as shown in FIG. 26C, left panel. It was then investigated whether a further increase in acid or chloride concentration would affect dissolution, due to such concentrations appearing in the dissolution literature. Increase of acid concentration led to a visual increase in nickel concentration, based on solution color, as seen in FIG. 26C middle panel, relative to FIG. 26C left panel. An increase of NaCl concentration led to a further deepening of the solution color in FIG. 26C right panel, relative to FIG. 26C middle panel. It was inferred that addition of these species influenced the complex reactions occurring during nickel dissolution, leading to an increase in current efficiency. A detailed analysis of the reaction system was out of the scope of this study, but the solution in trial (e) was used as the nickel component solution in the final mixed bath. This introduced an increased acid and chloride concentration in the final bath; the separate influence of adding such components on deposition was also further studied by altering their concentrations in the blank mix-in component. A view of all five baths after successful simultaneous dissolution is presented in FIG. 26C middle panel.

Unlike the other metals, whose successful dissolution was marked by a distinct color appearing in the electrolyte and lack of precipitate, the dissolution of Mo resulted in a dark precipitate film accumulating on the anode (FIG. 27A) and periodically falling into a near-clear, slightly-tan electrolyte (FIG. 27B). These observations were verified with prior work, which reports that Mo dissolves into a colorless VI oxidation state in acids, with a dark film forming on the anode. It has been established that some form of oxide, whose specific characteristics vary with pH, forms on the anodes as an intermediate in the overall dissolution reaction into the aqueous VI state. Manual agitation of the electrolyte with fallen precipitate resulted in observed dissolution of the precipitate (FIG. 27C). Together, the observations and literature check verified that the precipitate was a complex, soluble intermediate of the Mo dissolution reaction and not problematic. Dissolution of Mo differed from the other metals (Ni, Co, Fe, Cu) due to the presence of a film which was an expected intermediate species in dissolution (a precipitating film would be a concern with the other metals), due to the possibility of many Mo oxide reaction intermediates associated with Mo chemistry, and due to the presence of an ambiguous-colored (mostly clear, somewhat tan) electrolyte rather than an obvious vibrant color.

Five trials of dissolution were performed under identical input conditions to create the supply of constituent metal ion baths. The dissolution time was longest for metals with the largest target concentrations and volumes, with nickel taking the longest time. Plots of current and accumulated concentration over time are shown in FIGS. 28A, 28B, 28C, 28D, 28E, 28F, 28G, 28G, 28H, 28I, 28J, 28K, 28L, 28M, 28N, 28O, 28P, 28Q, 28R, 28S, and 28T. Due to Ni and Co dissolution taking a relatively long time, additional close-ups earlier in time are provided for Fe, Cu, and Mo dissolution. Qualitatively, the plots appear largely similar, with minor fluctuations from one trial to the other. It is also noted that some crosstalk appears between the currents, despite the cells being electrochemically separate. In trials 1 and 2, the end of Fe dissolution appears to trigger fluctuations in Co dissolution current. The end of Cu dissolution appears to trigger a shift in Mo dissolution current. The end of Fe and Mo dissolutions appear to cause a shift in Ni dissolution current. It is inferred that this crosstalk may occur due to the electrodes sourcing from a common power supply, oscillations within the microcontroller input circuitry, or due to perturbations caused by manual removal of the electrodes. It is also noted that the currents of Co and Cu dissolution appear relatively smooth compared to that of Ni, Fe, and Mo, which exhibit oscillations. These current patterns may be an indicator of surface electrochemical behavior, such as competing reactions.

Figure 29A:
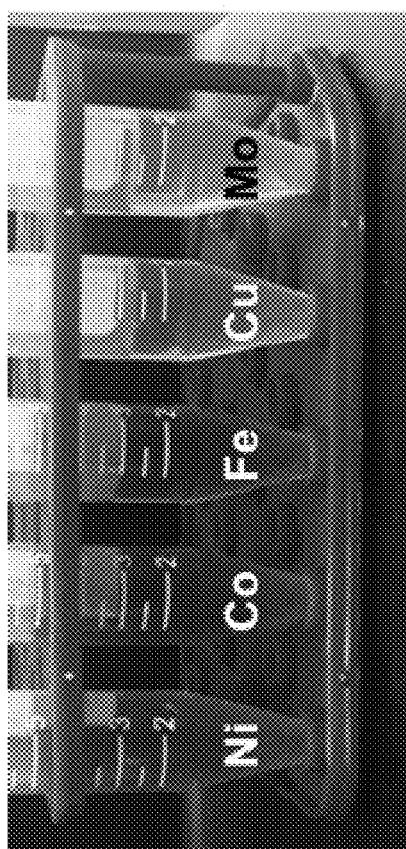
FIGS. 29A, 29B, and 29C are photographs of bath mixing sequences and variations.
Figure 29B:
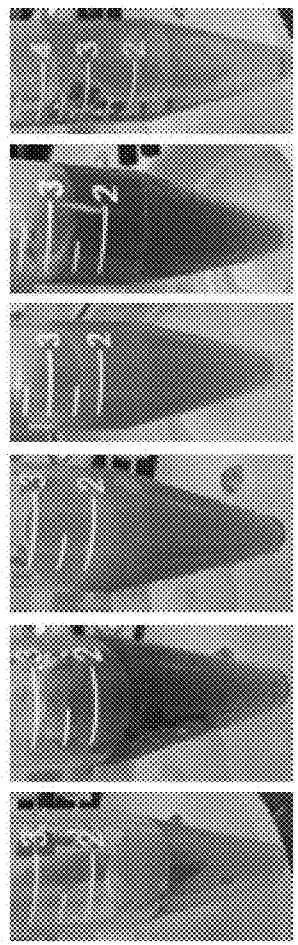
Figure 29C:
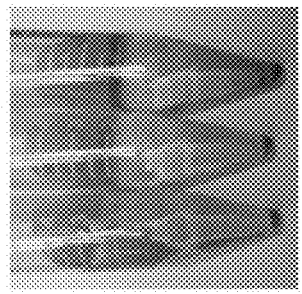

Mixing of individual metal baths was performed in a trial-and-error manner, exposing different behaviors that depended on bath mixing order. Due to the Co, Fe, Cu, and Mo completing significantly faster than Ni, an initial attempt to mix the four available baths was attempted and shown in the sequence in FIG. 29A, shown in six panels labelled i-vi. FIG. 29B includes six panels labelled i-vi. FIG. 29C includes three panels labelled i-iii. Addition of the Cu bath resulted in cloudy precipitate as shown in FIG. 29A, panel iii. This precipitate was still present after addition of molybdenum as shown in FIG. 29A, panel iv, but the bath appeared to regain translucence after approximately 10 hours, as shown in FIG. 29A, panel v. Addition of the highly-acidic Ni component bath yielded a clear solution, as shown in FIG. 29A, panel vi, and FIG. 29B, panel i. This prompted two more alternative sequences of solution addition to be explored. FIG. 29B, panel ii, shows an immediate Ni—Co—Fe—Cu—Mo mixing sequence, which yielded a clear solution at all stages. FIG. 29B, panel iii, shows an immediate Co—Fe—Cu—Mo—Ni mixing sequence, which showed identical precipitation behavior after Cu and Mo addition, but which turned transparent upon the addition of Ni, indicating that the use of the Ni bath avoids the need for the long delay. Overall, this shows that bath behavior is sensitive to mixing order, but the final results for this particular chemical system yield a transparent bath in the end for different approaches to mixing. It was found that some of the behaviors were sensitive to mixing order, but the end result was the same The full 300-voxel pillars were fabricated to completion in all baths. Deposition current and voxel build time were captured in-process. The average current across the entire run and the average time per voxel were calculated and listed in Table 13. For the most part, the current magnitude varied inversely with build time. However, the run with the largest current magnitude of −7.5 mA (bath 7, high Mo) did not yield the fastest build time—instead, the reference bath (bath 2, moderate acid) with a slightly lower current magnitude of −6.2 mA resulted in the fastest build time of 2.2 seconds per voxel. This discrepancy suggests that an elevated Mo concentration may introduce extra complexation and competing reactions which reduce the current efficiency of deposition, and that the reference bath 2 serves as a relatively current-efficient run as a reference point. An increase or decrease in acid relative to the reference resulted in lower current magnitude and longer build times. The current behavior arising from the introduction of high citrate concentration was very close to that of lower acid concentration—likely due to both reducing the conductivity of the cell—the former via fewer charge carriers in solution, and the latter due to ion complexation and lowering of reduction potential. Surprisingly, chloride addition did not accelerate the run—the current decreased slightly and the average voxel build time increased nearly threefold with respect to the reference run. Lowering the cobalt concentration increased the current magnitude, but resulted in a slower run—this indicated a lower current efficiency likely due to fewer cations being present to deposit under the applied voltage.

Figure 30:
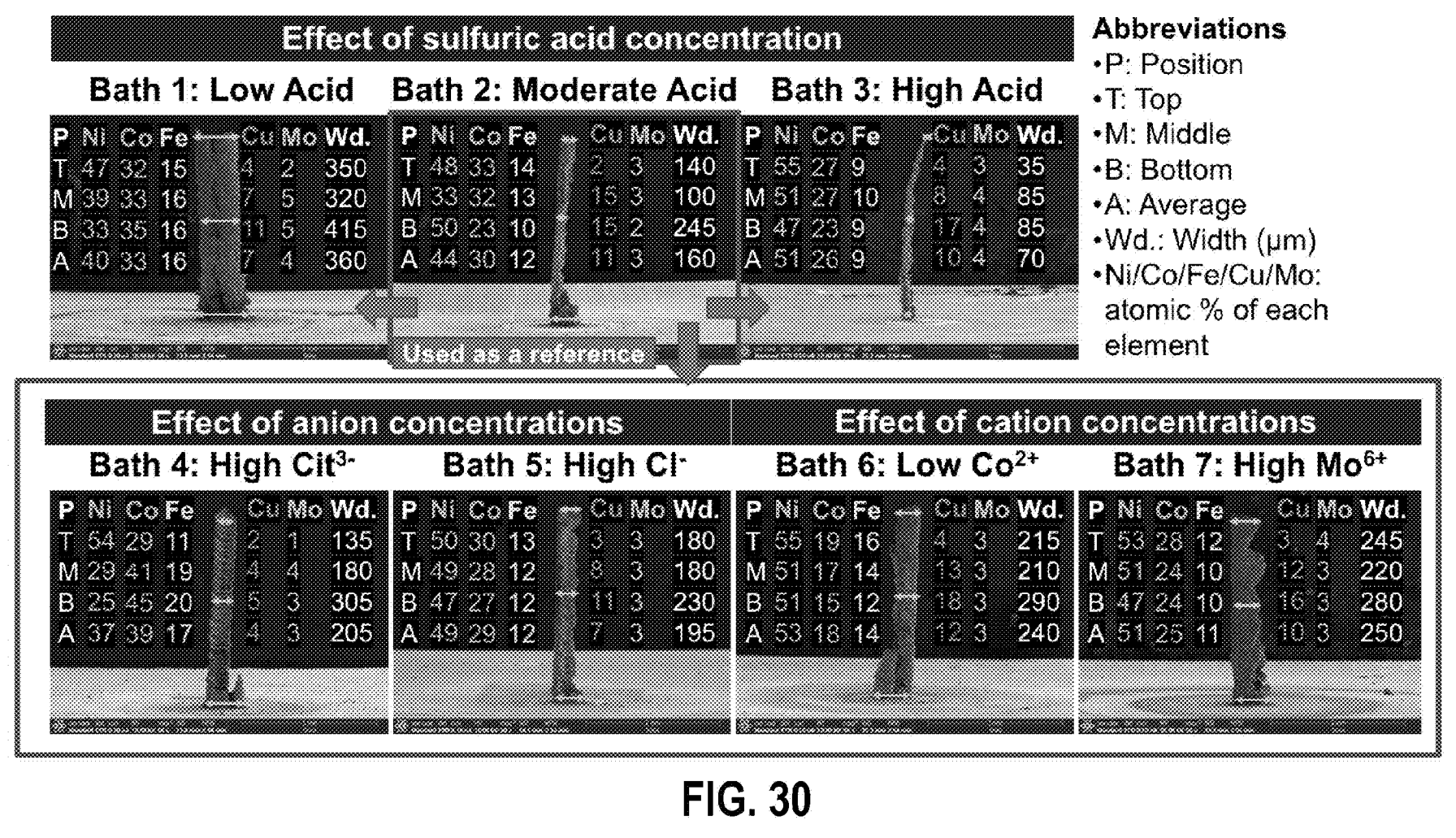

After fabrication, the pillars were characterized using SEM and EDX to capture the resulting geometry and elemental composition. Local atomic percentage and width values were manually obtained at the bottom, middle, and top points; averages were then taken across the entire pillar. All local and average values, superimposed on the SEM images, are shown in FIG. 30. Initially, the influence of the acid concentration was analyzed in baths 1-3. The moderate acid yielded a relatively balanced output of metal percentages, as well as a moderate width, compared to lower or higher acid baths 1 or 3. Therefore, this acid concentration was maintained in baths 4-7 for the subsequent adjustment of anion and cation concentration influences.

Relative differences in average pillar atomic compositions and widths were calculated for each bath with respect to the moderate acid bath 2, which was used as a reference. These values are listed in Table 13, along with overall takeaways for inferred functional properties and relative sizes of the output voxels. Magnetic properties are roughly differentiated into relatively hard—with higher Co and Fe percentages, or relatively soft—with Ni and Cu percentages. This is a rough generalization based on literature stating the former pair is associated with a higher coercivity, and the latter pair is reported to reduce coercivity to an extent. Increased conductivity is associated with a higher Cu content.

Mo content remained relatively unvarying and low—within 5%—across all baths. Even an increase in Mo ion concentration did not impact the output composition; however, it did appear to increase the percentage of nickel content and reduce that of the remaining metals. While a demonstration of deposition of all 5 metals was achieved, the results indicate that further system refinement is required to yield an increase in Mo content in the deposit. Finally, it was noted that there was an overall trend of lower currents and longer voxel times yielding wider pillars with higher concentrations of materials used in hard magnets.

TABLE 13

Calculated percent changes in pillar widths and atomic compositions under varying plating baths

| Deposition Bath | Avg Current (mA) | Avg Vox time (s) | % ΔNi | % ΔCo | % ΔFe | % ΔCu | % ΔMo | % ΔWd. | Mag prop. | Cond. | Vox. Size |
|---|---|---|---|---|---|---|---|---|---|---|---|
| (1) Low acid | −4.6 | 12.2 | −9 | +10 | +33 | −36 | +33 | +125 | Harder | Lower | Lg. |
| (2) Mod. acid | −6.2 | 2.2 | ±0 | ±0 | ±0 | ±0 | ±0 | ±0 | Ref | Ref | Ref |
| (3) High acid | −5.4 | 4.7 | +16 | −13 | −25 | −9 | +33 | −56 | Softer | Higher | Sm. |
| (4) High Cit | −4.6 | 13.9 | −16 | +30 | +42 | −64 | ±0 | +28 | Harder | Lower | Med. |
| (5) High Cl | −6.1 | 6.3 | +11 | −3 | ±0 | −36 | ±0 | +22 | Softer | Lower | Med. |
| (6) Low Co | −7.3 | 5.2 | +20 | −40 | +17 | +9 | ±0 | +50 | Softer | Higher | Med. |
| (7) Hi Mo | −7.5 | 4.2 | +16 | −17 | −8 | −9 | ±0 | +56 | Softer | Lower | Med. |

It is noted that although a percent decrease in Cu was calculated for high acid bath 3 versus moderate acid bath 2, an overall increase in Cu was observed with respect to the low acid bath 1.

Relatively harder magnetic features could be built using lower acid or higher citrate concentrations, with the former yielding larger voxel sizes and the latter yielding moderate voxel sizes. Both conditions led to a reduction in conductivity. If relatively softer magnetic features were desired, they could be built by increasing the concentration of acid, chloride anions, or molybdenum cations; or by decreasing the concentration of cobalt cations. These conditions yielded relatively moderate voxel sizes, except for increased acid concentration, which yielded significantly smaller voxel sizes that could be used for small features. Out of the conditions yielding softer magnetic properties, higher conductivity could be achieved using higher acid or lower cobalt cation concentrations, and lower conductivity with increased chloride or molybdenum concentrations.

The changes with respect to the identity of the changed species were also analyzed. It was observed that changes in acid concentration and citrate changed the Co and Fe concentrations, and Ni and Cu concentrations, in a paired manner. Coincidentally, these happen to correspond to pairs that yield hard versus soft magnetic materials, respectively. A high chloride concentration accelerated the deposition of nickel and appeared to suppress deposition of copper, supporting the chloride influences mentioned in the literature review. However, the remaining iron-group metals and molybdenum were not affected. As expected, a decrease in cobalt concentration led to a decrease in cobalt content in the solid, prompting near-equivalent increases in nickel and iron and a slight increase in copper.

Example 2 demonstrates an advancement of the electrochemical additive manufacturing process by introducing a combined dissolution-deposition control system, allowing for flexible control of solution compositions and extension of the deposited material system to a five-metal NiCoFeCuMo one, opening up opportunities for ECAM fabrication of high entropy alloy parts of emerging engineering interest.

All constituent metals were dissolved in blank electrolyte—consisting of only two supporting acids and two salts—with no initial metal ion concentrations. A "common blank" plating bath (with a minor adjustment for the Cu electrode) based on literature was attempted as a starting point. It was found that all metals except Ni successfully dissolved, prompting a further literature review and trial-and-error set of experiments to successfully dissolve Ni.

A few mixing sequences were attempted; it was found that bath behavior is sensitive to mixing order, particularly the pH of the emerging bath as it is being mixed. For this particular system, it was found that cloudy precipitate formed in one mixing sequence, which waned after a long delay and immediately disappeared after addition of the highly-acidic Ni constituent bath.

The mixed bath was found to successfully yield deposition of micro-scale pillars when used in a two-electrode closed-loop ECAM cell. The influence of varying acid, anion, and cation concentrations on the deposit was studied. Variation of acid in increments of 0.1 M yielded major changes in width. A 0.1 M increase in the citrate anion concentration yielded similar behavior to that of decreasing acid concentration. As expected, a decrease in cobalt concentration yielded a lower corresponding percentage in the deposit. However, across all runs, Mo content remained at a low percentage and did not vary significantly, even when the dissolved concentration was increased.

Overall, the deposition of five metals using sacrificial electrodes to source the metal ions was demonstrated. A variety of baths were studied to understand the roles of acid, anion, and cation concentrations. The systems could roughly be categorized into two categories—those suitable for constructing relatively large, hard magnetic features; and those suitable for constructing relatively small, soft magnetic or conductive features in ECAM-fabricated parts.

Although not described in detail herein, other steps which are readily interpreted from or incorporated along with the disclosed embodiments shall be included as part of the invention. The embodiments that have been described herein provide specific examples to portray inventive elements, but will not necessarily cover all possible embodiments commonly known to those skilled in the art.

What is claimed is:

1. A method comprising:
   providing a bath including a plurality of ions of a plurality of metals, wherein providing the bath comprises providing the plurality of ions of the plurality of metals to a solution comprising boric acid, sulfuric acid, chloride ions, and citrate ions;
   submerging, at least partially, an electrode including an electrode surface in the bath; and
   applying a voltage to the electrode to form a high entropy alloy on the electrode surface,
   wherein the voltage changes over time in response to a measured change in a concentration of at least one of the plurality of ions in the bath as the high entropy alloy forms on the electrode surface, and the high entropy alloy comprises CoCrCuFeMoNi.

2. The method of claim 1, wherein providing the bath includes dissolving the plurality of ions in the bath from a plurality of sacrificial electrodes.

3. The method of claim 2, wherein each of the plurality of sacrificial electrodes comprises a metal corresponding to the metal ion each sacrificial electrode dissolves into the bath.

4. The method of claim 1, wherein each concentration of each metal ion included in the bath is different from each other metal ion concentration included in the bath.

5. The method of claim 1, wherein the voltage is selective to deposit predetermined amounts and species of the metal ions included in the bath onto the electrode surface.

6. The method of claim 1, wherein the plurality of metals included in the high entropy alloy are each included in the same molar ratio.

7. The method of claim 1, wherein the bath comprises Ni, Co, Fe, Cu, and Mo.

8. The method of claim 7, wherein 20% of the bath, by volume, includes a blank solution component mixed in, wherein the blank solution component comprises an anion.

9. The method of claim 1, wherein the electrode is a Pt-Ir wire.

10. The method of claim 9, wherein applying the voltage to form the high entropy alloy on the electrode surface forms an amorphous magnetic microwire.

11. The method of claim 10, wherein the amorphous magnetic microwire has a diameter between 0.8 μm and 30 μm.

12. The method of claim 1, wherein after the high entropy alloy is formed on the electrode surface, the electrode has a gradient of iron percentage increasing radially towards the surface of the electrode.

13. The method of claim 1, wherein after the high entropy alloy is formed on the electrode surface, the electrode has a gradient of copper percentage increasing radially towards the center of the electrode.

14. The method of claim 1, wherein after the high entropy alloy is formed on the electrode surface, the electrode has a gradient of molybdenum percentage increasing linearly from a tip of the electrode to a base of the electrode.

15. A method comprising:
    providing a bath including a plurality of ions of a plurality of metals, wherein the bath is formed by mixing a plurality of supporting baths, each supporting bath comprising a single species of the plurality of metal ions included in the bath, and wherein each supporting bath further comprises boric acid and sulfuric acid;
    submerging, at least partially, an electrode including an electrode surface in the bath; and
    applying a voltage to the electrode to form a high entropy alloy on the electrode surface,
    wherein the voltage changes over time in response to a measured change in a concentration of at least one of the plurality of ions in the bath as the high entropy alloy forms on the electrode surface, and the high entropy alloy comprises CoCrCuFeMoNi.

16. The method of claim 15, wherein the copper ion supporting bath further comprises citrate ions and does not comprise chloride ions; wherein the nickel ion supporting bath further comprises chloride ions and does not comprise citrate; and wherein the supporting baths for each of the cobalt, chromium, iron, and molybdenum ions each further comprises chloride ions and citrate ions.

17. The method of claim 15, wherein providing the bath includes dissolving the plurality of ions in the bath from a plurality of sacrificial electrodes.

18. The method of claim 15, wherein the electrode is a Pt-Ir wire.

19. The method of claim 18, wherein applying the voltage to form the high entropy alloy on the electrode surface forms an amorphous magnetic microwire.

20. The method of claim 15, wherein after the high entropy alloy is formed on the electrode surface, the electrode has a metal composition percentage gradient selected from the list consisting of (i) a gradient of iron percentage increasing radially towards the surface of the electrode; (ii) a gradient of copper percentage increasing radially towards the center of the electrode; (iii) a gradient of molybdenum percentage increasing linearly from a tip of the electrode to a base of the electrode; and (iv) a combination thereof.

* * * * *